US011281711B2

(12) United States Patent
Sanders et al.

(10) Patent No.: US 11,281,711 B2
(45) Date of Patent: *Mar. 22, 2022

(54) MANAGEMENT OF LOCAL AND REMOTE MEDIA ITEMS

(71) Applicant: Apple Inc., Cupertino, CA (US)

(72) Inventors: Christopher John Sanders, San Jose, CA (US); Timothy B. Martin, Morgan Hill, CA (US); Imran Chaudhri, San Francisco, CA (US); Lucas C. Newman, San Francisco, CA (US); Sean Boland Kelly, San Francisco, CA (US); Thomas M. Alsina, Mountain View, CA (US); Jeffrey L. Robbin, Los Altos, CA (US); Andrew M. Wadycki, San Mateo, CA (US); Patrice O. Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,551

(22) Filed: Jul. 6, 2020

(65) Prior Publication Data

US 2021/0026880 A1 Jan. 28, 2021

Related U.S. Application Data

(63) Continuation of application No. 13/587,850, filed on Aug. 16, 2012, now Pat. No. 10,706,096.
(Continued)

(51) Int. Cl.
*G06F 3/14* (2006.01)
*G06F 16/438* (2019.01)

(52) U.S. Cl.
CPC .............................. *G06F 16/4387* (2019.01)

(58) Field of Classification Search
CPC ................................................... G06F 16/4387
(Continued)

(56) References Cited

U.S. PATENT DOCUMENTS 6,504,934 B1 1/2003 Kasai et al.
6,833,848 B1 12/2004 Wolff et al.
(Continued)

FOREIGN PATENT DOCUMENTS

CN 1620677 A 5/2005
CN 1813240 A 8/2006
(Continued)

OTHER PUBLICATIONS

"Customize Notifications and Content on Your Galaxy Phone's Lock Screen", Online Available at: https://www.samsung.com/us/support/answer/ANS00062636, Oct. 4, 2017, 5 pages.
(Continued)

*Primary Examiner* — Ruay Ho
(74) *Attorney, Agent, or Firm* — Dentons US LLP

(57) ABSTRACT

A method at a client device includes displaying media library information corresponding to a set of media items. The media items include one or more local media items, the one or more local media items including media items stored at the client device, and one or more remote media items, the one or more remote media items including media items stored at a remote system and not at the client device. The method also includes displaying, concurrently with displaying the media library information, affordances identifying the remote media items; detecting user interaction with an affordance identifying a respective remote media item; and in response to detecting the user interaction, initiating a process for downloading a copy of the respective remote media item to the client device for storage at the client device.

45 Claims, 18 Drawing Sheets

Related U.S. Application Data

(60) Provisional application No. 61/525,161, filed on Aug. 18, 2011.

(58) Field of Classification Search
USPC .............. 715/716; 455/414.1; 725/28, 44; 705/14.49, 39
See application file for complete search history.

(56) References Cited

U.S. PATENT DOCUMENTS

| | | |
|---|---|---|
| 7,571,014 B1 | 8/2009 | Lambourne et al. |
| 7,656,393 B2 | 2/2010 | King et al. |
| 8,046,804 B2 | 10/2011 | Kelts |
| 8,060,825 B2 | 11/2011 | Chaudhri et al. |
| 8,196,043 B2 | 6/2012 | Crow et al. |
| 8,280,539 B2 | 10/2012 | Jehan et al. |
| 8,290,603 B1 | 10/2012 | Lambourne |
| 8,458,780 B1 | 6/2013 | Takkallapally et al. |
| 8,682,722 B1* | 3/2014 | Des Jardins ....... H04N 21/2668 705/14.49 |
| 8,830,181 B1 | 9/2014 | Clark et al. |
| 9,084,003 B1 | 7/2015 | Sanio et al. |
| 9,112,849 B1 | 8/2015 | Werkelin Ahlin et al. |
| 9,134,902 B2 | 9/2015 | Kang et al. |
| 9,202,509 B2 | 12/2015 | Kallai et al. |
| 9,247,363 B2 | 1/2016 | Triplett et al. |
| 9,251,787 B1 | 2/2016 | Hart et al. |
| 9,294,853 B1 | 3/2016 | Dhaundiyal |
| 9,319,782 B1 | 4/2016 | Hilmes et al. |
| 9,450,812 B2 | 9/2016 | Lee et al. |
| 9,519,413 B2 | 12/2016 | Bates |
| 9,727,749 B2 | 8/2017 | Tzeng et al. |
| 9,794,720 B1 | 10/2017 | Kadri |
| 9,898,250 B1 | 2/2018 | Williams et al. |
| 9,954,989 B2 | 4/2018 | Zhou |
| 10,129,044 B2 | 11/2018 | Kangshang et al. |
| 10,284,980 B1 | 5/2019 | Woo et al. |
| 10,732,819 B2 | 8/2020 | Wang et al. |
| 10,824,299 B2 | 11/2020 | Bai |
| 10,833,887 B2 | 11/2020 | Wu |
| 2002/0002039 A1 | 1/2002 | Qureshey et al. |
| 2002/0048224 A1 | 4/2002 | Dygert et al. |
| 2003/0097358 A1 | 5/2003 | Mendez et al. |
| 2003/0182139 A1 | 9/2003 | Harris et al. |
| 2004/0019640 A1 | 1/2004 | Bartram et al. |
| 2004/0032955 A1 | 2/2004 | Hashimoto et al. |
| 2004/0261010 A1 | 12/2004 | Matsuishi |
| 2005/0097135 A1 | 5/2005 | Epperson et al. |
| 2006/0020637 A1 | 1/2006 | Kedem |
| 2006/0156239 A1 | 7/2006 | Jobs et al. |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0236847 A1 | 10/2006 | Withop |
| 2006/0258289 A1 | 11/2006 | Dua |
| 2006/0271425 A1 | 11/2006 | Goodman et al. |
| 2007/0027682 A1 | 2/2007 | Bennett |
| 2007/0113294 A1 | 5/2007 | Field et al. |
| 2007/0136778 A1 | 6/2007 | Birger et al. |
| 2007/0186235 A1* | 8/2007 | Jarman ............ H04N 21/25891 725/28 |
| 2008/0034011 A1 | 2/2008 | Cisler et al. |
| 2008/0036743 A1 | 2/2008 | Westerman et al. |
| 2008/0081558 A1 | 4/2008 | Dunko et al. |
| 2008/0084400 A1 | 4/2008 | Rosenberg |
| 2008/0091717 A1 | 4/2008 | Garbow et al. |
| 2008/0122796 A1 | 5/2008 | Jobs et al. |
| 2008/0126935 A1 | 5/2008 | Blomgren |
| 2008/0147735 A1 | 6/2008 | Sloo |
| 2008/0155474 A1 | 6/2008 | Duhig et al. |
| 2008/0214163 A1 | 9/2008 | Onyon et al. |
| 2008/0250319 A1 | 10/2008 | Lee et al. |
| 2008/0273712 A1 | 11/2008 | Eichfeld et al. |
| 2008/0273713 A1 | 11/2008 | Hartung et al. |
| 2008/0285772 A1 | 11/2008 | Haulick et al. |
| 2009/0007188 A1 | 1/2009 | Omernick |
| 2009/0125571 A1 | 5/2009 | Kiilerich et al. |
| 2009/0187981 A1 | 7/2009 | Pan et al. |
| 2009/0199130 A1 | 8/2009 | Tsern et al. |
| 2009/0265417 A1 | 10/2009 | Svendsen et al. |
| 2009/0304205 A1 | 12/2009 | Hardacker et al. |
| 2010/0004031 A1 | 1/2010 | Kim |
| 2010/0042654 A1 | 2/2010 | Heller et al. |
| 2010/0058253 A1 | 3/2010 | Son |
| 2010/0070490 A1 | 3/2010 | Amidon et al. |
| 2010/0094834 A1 | 4/2010 | Svendsen |
| 2010/0106647 A1 | 4/2010 | Raman |
| 2010/0131978 A1 | 5/2010 | Friedlander et al. |
| 2010/0174993 A1 | 7/2010 | Pennington et al. |
| 2010/0178873 A1 | 7/2010 | Lee et al. |
| 2010/0235729 A1 | 9/2010 | Kocienda et al. |
| 2010/0251304 A1 | 9/2010 | Donoghue et al. |
| 2010/0259482 A1 | 10/2010 | Ball |
| 2010/0284389 A1 | 11/2010 | Ramsay et al. |
| 2010/0296678 A1 | 11/2010 | Kuhn-rahloff et al. |
| 2010/0299639 A1 | 11/2010 | Ramsay et al. |
| 2010/0321201 A1 | 12/2010 | Huang et al. |
| 2010/0325239 A1 | 12/2010 | Khedouri et al. |
| 2011/0016089 A1 | 1/2011 | Freedman et al. |
| 2011/0082902 A1 | 4/2011 | Rottier et al. |
| 2011/0159469 A1 | 6/2011 | Hwang et al. |
| 2011/0159927 A1 | 6/2011 | Choi |
| 2011/0242002 A1 | 10/2011 | Kaplan et al. |
| 2011/0246942 A1 | 10/2011 | Misawa |
| 2011/0291971 A1 | 12/2011 | Masaki et al. |
| 2012/0004920 A1 | 1/2012 | Kelly et al. |
| 2012/0005708 A1* | 1/2012 | Kelts ............... H04N 21/4622 725/44 |
| 2012/0088477 A1* | 4/2012 | Cassidy ............. H04W 4/21 455/414.1 |
| 2012/0115608 A1 | 5/2012 | Pfeifer et al. |
| 2012/0178431 A1 | 7/2012 | Gold |
| 2012/0210226 A1 | 8/2012 | Mccoy et al. |
| 2012/0215684 A1* | 8/2012 | Kidron ............... G06F 15/167 705/39 |
| 2012/0222092 A1 | 8/2012 | Rabii |
| 2012/0260169 A1 | 10/2012 | Schwartz et al. |
| 2012/0272230 A1 | 10/2012 | Lee |
| 2012/0294118 A1 | 11/2012 | Haulick et al. |
| 2012/0311444 A1 | 12/2012 | Chaudhri |
| 2012/0323868 A1 | 12/2012 | Robbin et al. |
| 2013/0007617 A1 | 1/2013 | Mackenzie et al. |
| 2013/0027289 A1 | 1/2013 | Choi et al. |
| 2013/0047084 A1 | 2/2013 | Sanders et al. |
| 2013/0051755 A1 | 2/2013 | Brown et al. |
| 2013/0053107 A1 | 2/2013 | Kang et al. |
| 2013/0073584 A1 | 3/2013 | Kuper et al. |
| 2013/0080516 A1 | 3/2013 | Bologh |
| 2013/0080955 A1 | 3/2013 | Reimann et al. |
| 2013/0094666 A1 | 4/2013 | Haaff et al. |
| 2013/0094770 A1 | 4/2013 | Lee et al. |
| 2013/0138272 A1 | 5/2013 | Louise-Babando et al. |
| 2013/0159858 A1 | 6/2013 | Joffray et al. |
| 2013/0173794 A1 | 7/2013 | Agerbak et al. |
| 2013/0191454 A1 | 7/2013 | Oliver et al. |
| 2013/0194476 A1 | 8/2013 | Shimosato |
| 2013/0205375 A1 | 8/2013 | Woxblom et al. |
| 2013/0223821 A1 | 8/2013 | Issa et al. |
| 2013/0246522 A1 | 9/2013 | Bilinski et al. |
| 2013/0246916 A1 | 9/2013 | Reimann et al. |
| 2013/0322634 A1 | 12/2013 | Bennett et al. |
| 2013/0324081 A1 | 12/2013 | Gargi et al. |
| 2013/0346859 A1 | 12/2013 | Bates et al. |
| 2014/0037107 A1 | 2/2014 | Marino et al. |
| 2014/0047020 A1 | 2/2014 | Matus et al. |
| 2014/0049447 A1 | 2/2014 | Choi |
| 2014/0075311 A1 | 3/2014 | Boettcher et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0207707 A1 | 7/2014 | Na et al. |
| 2014/0233361 A1 | 8/2014 | Martin et al. |
| 2014/0267002 A1 | 9/2014 | Luna |

(56) References Cited

U.S. PATENT DOCUMENTS

| | | |
|---|---|---|
| 2014/0267911 A1 | 9/2014 | Grant et al. |
| 2014/0270183 A1 | 9/2014 | Luna |
| 2014/0335789 A1 | 11/2014 | Malamud et al. |
| 2014/0363024 A1 | 12/2014 | Apodaca |
| 2014/0364056 A1 | 12/2014 | Alsina et al. |
| 2014/0365904 A1 | 12/2014 | Kim et al. |
| 2015/0032812 A1 | 1/2015 | Dudley |
| 2015/0033361 A1 | 1/2015 | Choi et al. |
| 2015/0052222 A1 | 2/2015 | Farrell et al. |
| 2015/0067803 A1 | 3/2015 | Alduaiji |
| 2015/0113407 A1 | 4/2015 | Hoffert et al. |
| 2015/0130737 A1 | 5/2015 | Im et al. |
| 2015/0138101 A1 | 5/2015 | Park et al. |
| 2015/0149599 A1 | 5/2015 | Caunter et al. |
| 2015/0189426 A1 | 7/2015 | Pang |
| 2015/0205511 A1 | 7/2015 | Vinna et al. |
| 2015/0205971 A1 | 7/2015 | Sanio et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0243163 A1 | 8/2015 | Shoemake et al. |
| 2015/0248268 A1 | 9/2015 | Kumar et al. |
| 2015/0253960 A1 | 9/2015 | Lin et al. |
| 2015/0261493 A1 | 9/2015 | Lemmon et al. |
| 2015/0309768 A1 | 10/2015 | Van Der Heide |
| 2015/0312299 A1 | 10/2015 | Chen et al. |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0378522 A1 | 12/2015 | Butts et al. |
| 2016/0004417 A1 | 1/2016 | Bates |
| 2016/0026429 A1 | 1/2016 | Triplett |
| 2016/0048705 A1 | 2/2016 | Yang |
| 2016/0062567 A1 | 3/2016 | Yang et al. |
| 2016/0062606 A1 | 3/2016 | Vega et al. |
| 2016/0077734 A1 | 3/2016 | Buxton et al. |
| 2016/0088039 A1 | 3/2016 | Millington et al. |
| 2016/0092072 A1 | 3/2016 | So et al. |
| 2016/0127799 A1 | 5/2016 | Alsina et al. |
| 2016/0134942 A1 | 5/2016 | Lo |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0239167 A1 | 8/2016 | Reimann et al. |
| 2016/0246566 A1 | 8/2016 | Fullerton et al. |
| 2016/0253145 A1 | 9/2016 | Lee et al. |
| 2016/0291924 A1 | 10/2016 | Bierbower et al. |
| 2016/0295340 A1 | 10/2016 | Baker et al. |
| 2016/0299669 A1 | 10/2016 | Bates et al. |
| 2016/0342386 A1 | 11/2016 | Kallai et al. |
| 2016/0345039 A1 | 11/2016 | Billmeyer |
| 2016/0351191 A1 | 12/2016 | Lehtiniemi et al. |
| 2016/0360344 A1 | 12/2016 | Shim et al. |
| 2016/0366531 A1 | 12/2016 | Popova |
| 2016/0381476 A1 | 12/2016 | Gossain et al. |
| 2017/0013562 A1 | 1/2017 | Lim et al. |
| 2017/0031552 A1 | 2/2017 | Lin |
| 2017/0041727 A1 | 2/2017 | Reimann |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083494 A1 | 3/2017 | Yun et al. |
| 2017/0092270 A1 | 3/2017 | Newendorp et al. |
| 2017/0115940 A1 | 4/2017 | Byeon |
| 2017/0134567 A1 | 5/2017 | Jeon et al. |
| 2017/0235545 A1 | 8/2017 | Millington et al. |
| 2017/0242653 A1 | 8/2017 | Lang et al. |
| 2018/0039916 A1 | 2/2018 | Ravindra |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0337924 A1 | 11/2018 | Graham et al. |
| 2018/0351762 A1 | 12/2018 | Iyengar et al. |
| 2019/0012069 A1 | 1/2019 | Bates |
| 2019/0012073 A1 | 1/2019 | Hwang |
| 2019/0102145 A1 | 4/2019 | Wilberding et al. |
| 2019/0294406 A1 | 9/2019 | Bierbower et al. |
| 2020/0104018 A1 | 4/2020 | Coffman et al. |
| 2020/0201491 A1 | 6/2020 | Coffman et al. |
| 2020/0201495 A1 | 6/2020 | Coffman et al. |
| 2020/0225817 A1 | 7/2020 | Coffman et al. |
| 2020/0379711 A1 | 12/2020 | Graham et al. |
| 2020/0379714 A1 | 12/2020 | Graham et al. |
| 2020/0379716 A1 | 12/2020 | Carrigan |
| 2020/0379729 A1 | 12/2020 | Graham et al. |
| 2020/0379730 A1 | 12/2020 | Graham et al. |
| 2021/0011588 A1 | 1/2021 | Coffman et al. |
| 2021/0255819 A1 | 8/2021 | Graham et al. |
| 2021/0263702 A1 | 8/2021 | Carrigan |
| 2021/0392223 A1 | 12/2021 | Coffman et al. |

FOREIGN PATENT DOCUMENTS

| | | |
|---|---|---|
| CN | 1863281 A | 11/2006 |
| CN | 101002167 A | 7/2007 |
| CN | 101022395 A | 8/2007 |
| CN | 101350938 A | 1/2009 |
| CN | 101488138 A | 7/2009 |
| CN | 101501657 A | 8/2009 |
| CN | 101673207 A | 3/2010 |
| CN | 101854278 A | 10/2010 |
| CN | 101882409 A | 11/2010 |
| CN | 101931655 A | 12/2010 |
| CN | 102281294 A | 12/2011 |
| CN | 102301323 A | 12/2011 |
| CN | 102740146 A | 10/2012 |
| CN | 103260079 A | 8/2013 |
| CN | 103593154 A | 2/2014 |
| CN | 104106036 A | 10/2014 |
| CN | 105549947 A | 5/2016 |
| CN | 105794231 A | 7/2016 |
| CN | 105940678 A | 9/2016 |
| CN | 106030700 A | 10/2016 |
| CN | 106062810 A | 10/2016 |
| CN | 106383645 A | 2/2017 |
| EP | 1133119 A2 | 9/2001 |
| EP | 2018032 A1 | 1/2009 |
| EP | 2750062 A2 | 7/2014 |
| EP | 2770673 A1 | 8/2014 |
| EP | 3138300 A1 | 3/2017 |
| GB | 2402105 A | 12/2004 |
| JP | 5-266169 A | 10/1993 |
| JP | 2000-347921 A | 12/2000 |
| JP | 2007-534009 A | 11/2007 |
| JP | 2009-93206 A | 4/2009 |
| JP | 2009-543228 A | 12/2009 |
| JP | 2010-503922 A | 2/2010 |
| JP | 2010-257118 A | 11/2010 |
| KR | 10-2010-0036351 A | 4/2010 |
| KR | 10-2015-0121177 A | 10/2015 |
| KR | 10-2016-0141847 A | 12/2016 |
| KR | 10-2017-0027999 A | 3/2017 |
| MX | 336834 B | 2/2016 |
| WO | 2003/054832 A1 | 7/2003 |
| WO | 2005/031608 A2 | 4/2005 |
| WO | 2006/011139 A2 | 2/2006 |
| WO | 2006/130234 A2 | 12/2006 |
| WO | 2009/005563 A1 | 1/2009 |
| WO | 2009/086599 A1 | 7/2009 |
| WO | 2010/087988 A1 | 8/2010 |
| WO | 2012/004288 A1 | 1/2012 |
| WO | 2012/050927 A2 | 4/2012 |
| WO | 2013/026023 A1 | 2/2013 |
| WO | 2013/049346 A1 | 4/2013 |
| WO | 2013/153405 A2 | 10/2013 |
| WO | 2014/030320 A1 | 2/2014 |

(56) References Cited

FOREIGN PATENT DOCUMENTS

| WO | 2014/107469 A2 | 7/2014 |
|---|---|---|
| WO | 2014/151089 A1 | 9/2014 |
| WO | 2015/076930 A1 | 5/2015 |
| WO | 2015/124831 A1 | 8/2015 |
| WO | 2015/134692 A1 | 9/2015 |
| WO | 2016/033400 A1 | 3/2016 |
| WO | 2016/057117 A1 | 4/2016 |
| WO | 2017/058442 A1 | 4/2017 |

OTHER PUBLICATIONS

Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Intention to Grant received for Danish Patent Application No. PA202070560, dated Apr. 26, 2021, 2 pages.
Non-Final Office Action received for U.S. Appl. No. 16/922,675, dated May 4, 2021, 23 pages.
Notice of Allowance received for U.S. Appl. No. 16/702,968, dated Apr. 21, 2021, 20 pages.
Notice of Allowance received for U.S. Appl. No. 16/807,604, dated Apr. 30, 2021, 25 pages.
"Smart Home App—What is the Widget", Online Available at: https://support.vivinl.com/s/article/Vivint-Smart-Home-App-What-is-the-Widget, Jan. 26, 2019, 4 pages.
Stroud Forrest, "Screen Lock Meaning & Definition", Online Available at: https://www.webopedia.com/definitions/screen-lock, Jan. 30, 2014, 3 pages.
Corrected Notice of Allowance received for U.S. Appl. No. 16/807,604, dated Jul. 26, 2021, 3 pages.
Corrected Notice of Allowance received for U.S. Appl. No. 17/031,833, dated Aug. 2, 2021, 3 pages.
Intention to Grant received for European Patent Application No. 18197583.0, dated Jul. 23, 2021, 9 pages.
Notice of Allowance received for U.S. Appl. No. 16/888,775, dated Jul. 26, 2021, 5 pages.
Office Action received for Chinese Patent Application No. 201811367893.8, dated Jun. 21, 2021, 18 pages (8 pages of English Translation and 10 pages of Official Copy).
Office Action received for Chinese Patent Application No. 201911128105.4, dated Jul. 3, 2020, 18 pages (9 pages of English Translation and 9 pages of Official Copy).
Applicant-Initiated Interview Summary received for U.S. Appl. No. 17/031,833, dated May 24, 2021, 6 pages.
Corrected Notice of Allowance received for U.S. Appl. No. 16/702,968, dated May 26, 2021, 4 pages.
Non-Final Office Action received for U.S. Appl. No. 16/803,849, dated May 14, 2021, 34 pages.
Notice of Hearing received for Indian Patent Application No. 717/CHENP/2014, dated May 5, 2021, 3 pages.
Office Action received for Chinese Patent Application No. 201911128105.4, dated Apr. 8, 2021, 10 pages (5 pages of English Translation and 5 pages of Official Copy).
Office Action received for European Patent Application No. 19207753.5, dated May 10, 2021, 4 pages.
Office Action received for European Patent Application No. 20158824.1, dated May 18, 2021, 10 pages.
Final Office Action received for U.S. Appl. No. 17/031,833, dated Jan. 26, 2021, 17 pages.
Intention to Grant received for European Patent Application No. 18197589.7, dated Jan. 21, 2021, 8 pages.
Notice of Allowance received for U.S. Appl. No. 15/910,263, dated Jan. 22, 2021, 33 pages.
Notice of Allowance received for U.S. Appl. No. 16/922,675, dated Jan. 21, 2021, 7 pages.
Office Action received for Chinese Patent Application No. 201911128105.4, dated Jan. 4, 2021, 14 pages (7 pages of English Translation and 7 pages of Official Copy).
Applicant-Initiated Interview Summary received for U.S. Appl. No. 16/803,849, dated Aug. 21, 2020, 5 pages.
Extended European Search Report received for European Patent Application No. 20158824.1, dated Aug. 10, 2020, 13 pages.
Final Office Action received for U.S. Appl. No. 16/807,604, dated Aug. 19, 2020, 35 pages.
Summons to Attend Oral Proceedings received for European Patent Application No. 18197583.0, dated Aug. 14, 2020, 12 pages.
Brief Communication Regarding Oral Proceedings received for European Patent Application No. 18197583.0, dated Feb. 18, 2021, 2 pages.
Corrected Notice of Allowance received for U.S. Appl. No. 15/910,263, dated Feb. 10, 2021, 3 pages.
Final Office Action received for U.S. Appl. No. 16/723,583, dated Feb. 5, 2021, 15 pages.
Notice of Allowance received for U.S. Appl. No. 15/910,263, dated Feb. 18, 2021, 3 pages.
Advisory Action received for U.S. Appl. No. 16/583,989, dated Sep. 22, 2020, 5 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/584,490, dated Jul. 28, 2020, 4 pages.
Applicant-Initiated Interview Summary received for U.S. Appl. No. 15/910,263, dated Nov. 18, 2020, 6 pages.
Applicant-Initiated Interview Summary received for U.S. Appl. No. 16/584,490, dated Jan. 31, 2020, 4 pages.
Applicant-Initiated Interview Summary received for U.S. Appl. No. 16/922,675, dated Nov. 2, 2020, 3 pages.
Final Office Action received for U.S. Appl. No. 16/583,989, dated Jul. 10, 2020, 23 pages.
Final Office Action received for U.S. Appl. No. 16/584,490, dated May 1, 2020, 48 pages.
Final Office Action received for U.S. Appl. No. 16/922,675, dated Nov. 30, 2020, 12 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Non-Final Office Action received for U.S. Appl. No. 16/583,989, dated Jan. 24, 2020, 20 pages.
Non-Final Office Action received for U.S. Appl. No. 16/584,490, dated Dec. 10, 2019, 27 pages.
Non-Final Office Action received for U.S. Appl. No. 16/723,583, dated Aug. 13, 2020, 13 pages.
Non-Final Office Action received for U.S. Appl. No. 16/922,675, dated Aug. 13, 2020, 17 pages.
Notice of Allowance received for U.S. Appl. No. 16/584,490, dated Aug. 27, 2020, 13 pages.
Office Action received for Chinese Patent Application No. 201811539260.0, dated Nov. 4, 2020, 9 pages (5 pages of English Translation and 4 pages of Official Copy).
Office Action received for European Patent Application No. 19207753.5, dated Nov. 12, 2020, 5 pages.

(56) References Cited

OTHER PUBLICATIONS

Result of Consultation received for European Patent Application No. 18197589.7, dated Dec. 1, 2020, 9 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Decision to Refuse received for European Patent Application No. 19169980.0, dated Jul. 15, 2021, 4 pages.
Notice of Allowance received for Brazilian Patent Application No. BR112014003009-0, dated Jun. 15, 2021, 3 pages (1 page of English Translation and 2 pages of Official Copy).
Applicant-Initiated Interview Summary received for U.S. Appl. No. 16/922,675, dated Dec. 16, 2020, 3 pages.
Final Office Action received for U.S. Appl. No. 16/922,675, dated Dec. 3, 2020, 21 pages.
Non-Final Office Action received for U.S. Appl. No. 17/031,833, dated Dec. 7, 2020, 13 pages.
Summons to Attend Oral Proceedings received for European Patent Application No. 19169980.0, dated Dec. 3, 2020, 8 pages.
Hein Buster, "iOS 5 Allows Users to Delete Music Directly From iPhone/iPad", Online available at: https://www.cultofmac.com/99990/ios-5-allows-users-to-delete-music-directly-from-iphoneipad/, Jun. 9, 2011, 7 pages.
NBC News, "NBC News—YouTube Democratic Debate (full)", Online available at:-https://www.youtube.com/watch?v=ti2Nokoq1J4, Jan. 17, 2016, 1 page.
Applicant-Initiated Interview Summary received for U.S. Appl. No. 16/836,571, dated Jul. 7, 2021, 6 pages.
Brief Communication Regarding Oral Proceedings received for European Patent Application No. 19169980.0, dated Jun. 17, 2021, 2 pages.
Corrected Notice of Allowance received for U.S. Appl. No. 16/702,968, dated Jun. 28, 2021, 4 pages.
Corrected Notice of Allowance received for U.S. Appl. No. 16/807,604, dated Jun. 28, 2021, 3 pages.
Notice of Allowance received for U.S. Appl. No. 17/031,833, dated Jun. 25, 2021, 15 pages.
Office Action received for Chinese Patent Application No. 202010125114.4, dated Jun. 7, 2021, 7 pages (4 pages of English Translation and 3 pages of Official Copy).
Applicant-Initiated Interview Summary received for U.S. Appl. No. 16/702,968, dated Sep. 28, 2020, 6 pages.
Final Office Action received for U.S. Appl. No. 16/803,849, dated Sep. 24, 2020, 29 pages.
Invitation to Pay Search Fees received for European Patent Application No. 18728002.9, dated Sep. 2, 2020, 8 pages.
Office Action received for Chinese Patent Application No. 202010125114.4, dated Aug. 21, 2020, 16 pages (8 pages of English Translation and 8 pages of Official Copy).
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.
Decision to Grant received for European Patent Application No. 18197589.7, dated Jun. 10, 2021, 2 pages.
Notice of Allowance received for U.S. Appl. No. 16/888,775, dated Jun. 3, 2021, 11 pages.

Office Action received for Chinese Patent Application No. 201811539259.8, dated Sep. 3, 2020, 10 pages (6 pages of English Translation and 4 pages of Official Copy).
Minutes of the Oral Proceedings received for European Patent Application No. 18197583.0, dated Mar. 9, 2021, 6 pages.
Notice of Acceptance received for Australian Patent Application No. 2019268111, dated Feb. 18, 2021, 3 pages.
Result of Consultation received for European Patent Application No. 18197583.0, dated Feb. 24, 2021, 3 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for U.S. Appl. No. 16/584,490, dated Mar. 26, 2021, 13 pages.
Office Action received for Danish Patent Application No. PA202070560, dated Mar. 10, 2021, 7 pages.
Notice of Allowance received for U.S. Appl. No. 16/583,989, dated Apr. 1, 2021, 5 pages.
Office Action received for Chinese Patent Application No. 202010125114.4, dated Mar. 1, 2021, 15 pages (9 pages of English Translation and 6 pages of Official Copy).
Supplemental Notice of Allowance received for U.S. Appl. No. 16/584,490, dated Apr. 13, 2021, 2 pages.
Office Action received for Australian Patent Application No. 2019268111, dated Oct. 27, 2020, 7 pages.
Advisory Action received for U.S. Appl. No. 13/587,850, dated May 15, 2015, 2 pages.
Corrected Notice of Allowance received for U.S. Appl. No. 13/587,850, dated Apr. 1, 2020, 2 pages.
Corrected Notice of Allowance received for U.S. Appl. No. 13/587,850, dated Mar. 23, 2020, 2 pages.
Decision on Appeal received for U.S. Appl. No. 13/587,850, dated Aug. 28, 2019, 21 pages.
Decision on Appeal received for U.S. Appl. No. 13/587,850, dated Oct. 21, 2019, 3 pages.
Decision to Refuse received for European Patent Application No. 12753631.6, dated Feb. 20, 2019, 20 pages.
Extended European Search Report received for European Patent Application No. 19169980.0, dated Jul. 2, 2019, 8 pages.
Final Office Action received for U.S. Appl. No. 13/587,850, dated May 3, 2016, 31 pages.
"How-To: iTunes in the Cloud", available at <http://y2kemo.com/2011/06/how-to-itunes-in-the-cloud/>, XP55040711, Jun. 9, 2011, 4 pages.
Minutes of the Oral Proceedings received for European Patent Application No. 12753631.6, dated Feb. 20, 2019, 3 pages.
Notice of Acceptance received for Australian Patent Application No. 2016201454, dated Mar. 1, 2018, 3 pages.
Notice of Allowance received for Chinese Patent Application No. 201280040169.9, dated Sep. 4, 2018, 3 pages.
Notice of Allowance received for Japanese Patent Application No. 2016-022175, dated Jan. 12, 2018, 4 pages.
Notice of Allowance received for Korean Patent Application No. 10-2017-7035057, dated May 31, 2018, 4 pages.
Notice of Allowance received for Mexican Patent Application No. MX/a/2016/001209, dated Mar. 26, 2018, 3 pages.
Notice of Allowance received for U.S. Appl. No. 13/587,850, dated Feb. 27, 2020, 5 pages.
Notice of Allowance received for U.S. Appl. No. 13/587,850, dated Nov. 8, 2019, 6 pages.
Office Action received for Australian Patent Application No. 2016201454, dated Mar. 29, 2017, 3 pages.
Office Action received for Australian Patent Application No. 2018203624, dated Feb. 5, 2020, 4 pages.
Office Action received for Australian Patent Application No. 2018203624, dated Mar. 11, 2020, 5 pages.

(56) References Cited

OTHER PUBLICATIONS

Office Action received for Australian Patent Application No. 2018203624, dated Mar. 15, 2019, 6 pages.
Office Action received for Australian Patent Application No. 2018203624, dated Oct. 30, 2019, 5 pages.
Office Action received for Brazilian Patent Application No. BR112014003009-0, dated Oct. 29, 2019, 6 pages.
Office Action received for Chinese Patent Application No. 201280040169.9, dated Jun. 1, 2016, 10 pages.
Office Action received for Chinese Patent Application No. 201280040169.9, dated Mar. 31, 2017, 13 pages.
Office Action received for Chinese Patent Application No. 201280040169.9, dated May 14, 2018., 6 pages.
Office Action received for Chinese Patent Application No. 201280040169.9, dated Sep. 20, 2017, 14 pages.
Office Action received for European Patent Application No. 12753631.6, dated Jul. 10, 2017, 6 pages.
Office Action received for European Patent Application No. 19169980.0, dated Mar. 4, 2020, 6 pages.
Office Action Received for Indian Patent Application No. 717/CHENP/2014, dated Feb. 7, 2019, 5 pages.
Office Action received for Japanese Patent Application No. 2016-022175, dated Apr. 10, 2017, 11 pages.
Office Action received for Korean Patent Application No. 10-2016-7022902, dated Sep. 4, 2017, 3 pages.
Office Action received for Korean Patent Application No. 10-2017-7035057, dated Mar. 21, 2018, 10 pages.
Office Action received for Mexican Patent Application No. MX/a/2016/001209, dated Apr. 20, 2017, 5 pages.
Office Action received for Mexican Patent Application No. MX/a/2016/001209, dated Aug. 25, 2016, 4 pages.
Office Action received for Mexican Patent Application No. MX/a/2016/001209, dated Sep. 13, 2017, 5 pages.
Summons to Attend Oral Proceedings received for European Patent Application No. 12753631.6, dated Jul. 6, 2018, 5 pages.
Summons to Attend Oral Proceedings received for European Patent Application No. 12753631.6, dated May 8, 2018, 9 pages.
Notice of Allowance received for Korean Patent Application No. 10-2014-7006538, dated May 19, 2016, 3 pages.
Office Action received for Korean Patent Application No. 10-2014-7006538, dated Jul. 31, 2015, 8 pages.
Final Office Action received for U.S. Appl. No. 13/587,850, dated Nov. 28, 2014, 22 pages.
Non-Final Office Action received for U.S. Appl. No. 13/587,850, dated Oct. 8, 2015, 29 pages.
Non-Final Office Action received for U.S. Appl. No. 13/587,850, dated Apr. 7, 2014, 18 pages.
Office Action received for Australian Patent Application No. 2012296381, dated Jan. 21, 2016, 5 pages.
Office Action received for Australian Patent Application No. 2012296381, dated Mar. 4, 2016, 4 pages.
Office Action received for Australian Patent Application No. 2012296381, dated Mar. 6, 2015, 4 pages.
Notice of Allowance received for Japanese Patent Application No. 2014-526255, dated Jan. 7, 2016, 6 pages.
Office Action received for Japanese Patent Application No. 2014-526255, dated Jun. 12, 2015, 5 pages.
Ciprianij, "How to use Spotify's Offline mode on iPhone", XP055533907, retrieved from the Internet : URL : https://www.cnet.com/how-to/how-to-use-spotifys-offline-mode-on-iphone/, Aug. 1, 2011, 5 pages.
Hughes Neil, "Apple Explores Merging Cloud Content with Locally Stored Media Library", Available at <http://appleinsider.com/articles/11/02/10/apple_explores_merging_cloud_content_with_locally_stored_media_library.html>, XP55040717, Feb. 10, 2011, 2 pages.
Kanter David, "Start Download Automatically Sync Your (New) Music, Apps, and IBooks Across Your iDevices with iCloud", Available online at https://appadvice.com/appnn/2011/06/automatically-sync-music-apps-ibooks-idevices-icioud, Jun. 8, 2011, 6 pages.

Mac Fan,"Chapter 4: The True Character of Apple's Genuine Cloud—Your Personal Data Always Exist in There, Regardless of Your Location", Mainichi Communications Inc., vol. 19, No. 8, Aug. 1, 2011, 8 pages.
Mcelhearn Kirk, "iTunes 10.3 Offers Automatic Downloads and Access to Purchases", Available at <http://web.archive.org/web/20110613084837/http://www.tidbits.com/article/12235>, Jun. 8, 2011, 5 pages.
Notice of Allowance received for Mexican Patent Application No. MX/a/2014/001761, dated Sep. 11, 2015, 3 pages.
Office Action received for Mexican Patent Application No. MX/a/2014/001761, dated Jan. 22, 2015, 3 pages.
International Preliminary Report on Patentability received for PCT Patent Application No. PCT/US2012/051432, dated Feb. 27, 2014, 10 pages.
International Search Report and Written Opinion received for PCT Patent Application No. PCT/US2012/051432, dated Oct. 29, 2012, 12 pages.
Planet Quark, "See Everything Your Mac Printed", XP055533938, retrieved from the Internet: URL: https://www.planetquark.com/2011/05/19/see-everything-your-mac-printed/#.XjkfQsgzZGM, May 19, 2011, 7 pages.
Ricker Thomas, "iTunes (in the Cloud) 10.3 beta available for download, we go hands-on", retrieved from the internet: https://www.engadget.com/2011/06/07/itunes-in-the-cloud-10-3-beta-available-for-download-we-go-ha/, 2011, 12 pages.
Applicant Initiated Interview Summary received for U.S. Appl. No. 16/702,968, dated Jul. 1, 2020, 5 pages.
Applicant-Initiated Interview Summary received for U.S. Appl. No. 16/807,604, dated Jul. 24, 2020, 5 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19207753.5, dated Dec. 18, 2019, 9 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 15/910,263, dated Aug. 28, 2019, 32 pages.
Final Office Action received for U.S. Appl. No. 16/702,968, dated Jul. 27, 2020, 21 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 Pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.

(56) References Cited

OTHER PUBLICATIONS

Intention to Grant received for Danish Patent Application No. PA201770408, dated Nov. 30, 2018, 3 pages.
International Preliminary Report on Patentability received for PCT Patent Application No. PCT/US2018/032904, dated Nov. 28, 2019, 14 pages.
International Search Report and Written Opinion received for PCT Patent Application No. PCT/US2018/032904, dated Oct. 1, 2018, 21 pages.
Invitation to Pay Addition Fees and Partial International Search Report received for PCT Patent Application No. PCT/US2018/032904, dated Jul. 31, 2018, 18 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 Pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.
Non-Final Office Action received for U.S. Appl. No. 16/702,968, dated Apr. 8, 2020, 20 pages.
Non-Final Office Action received for U.S. Appl. No. 16/803,849, dated Jul. 13, 2020, 23 pages.
Non-Final Office Action received for U.S. Appl. No. 16/807,604, dated Jun. 2, 2020, 28 pages.
Notice of Acceptance received for Australian Patent Application No. 2018223051, dated Oct. 30, 2018, 3 Pages.
Notice of Acceptance received for Australian Patent Application No. 2018236872, dated Jul. 9, 2019, 3 pages.
Notice of Allowance received for Chinese Patent Application No. 201880001436.9, dated May 8, 2020, 3 pages (2 pages of English Translation and 1 page of Official Copy).
Notice of Allowance received for Danish Patent Application No. PA201770408, dated Feb. 8, 2019, 2 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Chinese Patent Application No. 201811539259.8, dated Apr. 3, 2020, 10 pages (6 pages of English Translation and 4 pages of Official Copy).
Office Action received for Chinese Patent Application No. 201811539259.8, dated Sep. 18, 2019, 12 pages (6 pages of English Translation and 6 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201811539260.0, dated Oct. 8, 2019, 14 pages (7 pages of English Translation and 7 pages of Official Copy).
Office Action received for Chinese Patent Application No. 201880001436.9, dated Apr. 28, 2019, 19 pages (11 pages of English Translation and 8 pages of Official copy).
Office Action received for Chinese Patent Application No. 201880001436.9, dated Nov. 6, 2019, 24 pages (15 pages of English Translation and 9 pages of Official Copy).
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 Pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017., 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 18197583.0, dated Feb. 28, 2020, 8 pages.
Office Action received for European Patent Application No. 18197589.7, dated Oct. 1, 2019, 5 pages.
Partial European Search Report received for European Patent Application No. 20158824.1, dated May 8, 2020, 14 pages.
Partial European Search Report received for European Patent Application No. 18197583.0, dated Jan. 14, 2019, 18 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.

(56) References Cited

OTHER PUBLICATIONS

Search Report and Opinion received for Danish Patent Application No. PA201870598, dated Dec. 5, 2018, 8 pages.
Search Report received for Danish Patent Application No. PA201770404, dated Jun. 20, 2017., 8 Pages.
Search Report received for Danish Patent Application No. PA201770409, dated Jun. 20, 2017., 9 Pages.
Summons to attend Oral proceedings received for European Patent Application No. 18197589.7, dated Apr. 9, 2020, 7 pages.
Final Office Action received for U.S. Appl. No. 11/960,674, dated May 12, 2011, 10 pages.
Non-Final Office Action received for U.S. Appl. No. 11/960,674, dated Oct. 27, 2010, 7 pages.
Notice of Allowance received for U.S. Appl. No. 11/960,674, dated Sep. 2, 2011, 7 pages.
Apple,"IPhone User's Guide", iPhone first generation, Available at: <http://pocketpccentral.net/iphone/products/1 g_iphone.htm>, Jun. 29, 2007, 124 pages.
Call Me, "Samsung R3 højttaler giver dig en lækker 360 graders lydoplevelse—med WiFi og Bluetooth | Call me", 0:24 / 3:22, Available Online at: <https://www.youtube.com/watch?v=4Uv_sOhrlro>, Sep. 22, 2016, 3 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Review: Samsung Radiant R3 Wireless Speakers, Available Online at: <https://www.youtube.com/watch?v=ZBICVE1WdKE>, Jan. 19, 2016, 3 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Jarvie, "Alexa plays me music", Available online at https://www.youtube.com/watch?v=bR2ZC8Sy8YQ, Feb. 23, 2015, 1 page.
International Preliminary Report on Patentability received for PCT Patent Application No. PCT/US2007/088914, dated Jul. 7, 2009, 8 pages.
International Search Report and Written Opinion received for PCT Patent Application No. PCT/US2007/088914, dated Jun. 23, 2008, 10 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
Party Share—turn your Xperia into a jukebox, online available at:—"https://forum.xda-developers.com/crossdevice-dev/sony/app-partyshare-xperia-jukebox-t2877807", Sep. 15, 2014, 5 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Smarttricks, "Top 3 Music Player for Android", Available online at: <https://www.youtube.com/watch?v=He7RTn4CL34>, Feb. 22, 2017, 4 pages.
Sonos, "Sonos Controller App for iPad Product Guide", Available online at:—https://www.sonos.com/documents/productguides/en/iPadGuide_EN.pdf, Nov. 2014, 47 pages.
Woolsey Amanda, "Apple Watch Tips—How to Add and Play Music", Available online at: <https://www.youtube.com/watch?v=E0QEuqMaoi8>, Apr. 26, 2015, 3 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Decision to Grant received for Danish Patent Application No. PA202070560, dated Oct. 21, 2021, 2 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Corrected Notice of Allowance received for U.S. Appl. No. 16/836,571, dated Nov. 18, 2021, 3 pages.
Extended European Search Report received for European Patent Application No. 21197457.1, dated Nov. 15, 2021, 8 pages.
Non-Final received for U.S. Appl. No. 17/461,103, dated Nov. 22, 2021, 15 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Applicant-Initiated Interview Summary received for U.S. Appl. No. 16/922,675, dated Sep. 3, 2021, 2 pages.
Intention to Grant received for European Patent Application No. 19207753.5, dated Sep. 3, 2021, 8 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Corrected Notice of Allowance received for U.S. Appl. No. 16/836,571, dated Nov. 4, 2021, 4 pages.
Final Office Action received for U.S. Appl. No. 16/803,849, dated Nov. 2, 2021, 37 pages.
Office Action received for Australian Patent Application No. 2021204454, dated Aug. 9, 2021, 7 pages.
Applicant-initiated Interview Summary received for U.S. Appl. No. 16/803,849, dated Oct. 12, 2021, 6 pages.
Corrected Notice of Allowance received for U.S. Appl. No. 16/807,604, dated Oct. 4, 2021, 5 pages.
Corrected Notice of Allowance received for U.S. Appl. No. 16/836,571, dated Oct. 12, 2021, 4 pages.
Notice of Allowance received for U.S. Appl. No. 16/922,675, dated Sep. 27, 2021, 10 pages.
Search Report and Opinion received for Danish Patent Application No. PA202170320, dated Oct. 6, 2021, 9 pages.
Office Action received for Australian Patent Application No. 2020282362, dated Nov. 25, 2021, 3 pages.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 17/031,833, dated Dec. 21, 2020, 5 pages.
Notice of Allowance received for U.S. Appl. No. 16/583,989, dated Dec. 24, 2020, 7 pages.
Office Action received for Danish Patent Application No. PA202070560, dated Dec. 11, 2020, 7 pages.
Office Action received for European Patent Application No. 18728002.9, dated Dec. 14, 2020, 15 pages.
Result of Consultation received for European Patent Application No. 18197589.7, dated Dec. 17, 2020, 6 pages.
Corrected Notice of Allowance received for U.S. Appl. No. 16/836,571, dated Dec. 6, 2021, 5 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
Notice of Allowance received for Chinese Patent Application No. 202010125114.4, dated Nov. 24, 2021, 2 pages (1 page of English Translation and 1 page of Official Copy).

(56) References Cited

OTHER PUBLICATIONS

Notice of Allowance received for Korean Patent Application No. 10-2021-7035472, dated Nov. 23, 2021, 4 pages (2 pages of English Translation and 2 pages of Official Copy).
Summons to Attend Oral Proceedings received for European Patent Application 20158824.1, dated Dec. 7, 2021, 6 pages.
Office Action received for Chinese Patent Application No. 201811367893.8, dated Nov. 29, 2021, 6 pages (3 pages of English Translation and 3 pages of Official Copy).

* cited by examiner

800

802 Display media library information corresponding to a set of media items, the media items including: one or more local media items, the one or more local media items comprising media items stored at the client device, and one or more remote media items, the one or more remote media items comprising media items stored at a remote system and not at the client device

804 Displaying media library information further comprises suppressing display of respective media items in the set of media items that match predefined filter criteria

806 Display, concurrently with displaying the media library information, affordances identifying the remote media items

808 Detect user interaction with an affordance identifying a respective remote media item

810 In response to detecting the user interaction, initiate a process for downloading a copy of the respective remote media item to the client device for storage at the client device

812 Downloading a copy of the respective remote media item includes downloading the copy for storage at the client device

814 Downloading a copy of the respective remote media item includes downloading the copy into a cache

816 Respond to a predefined user command with respect to a playlist that includes one or more local media items and one or more remote media items, by playing the media items in the playlist in a sequence determined by the playlist

818 Determine whether the client device has a connection to the remote system

820 Respond to a predefined user command with respect to a playlist that includes one or more local media items and one or more remote media items, when a connection to the remote system is present, by playing the media items in the playlist in a sequence determined by the playlist

822 Respond to a predefined user command with respect to the playlist, when a connection to the remote system is absent, by playing only the local media items in the playlist in the sequence determined by the playlist

Displaying the media library information includes displaying a list identifying the local media items and the remote media items; and displaying the affordances includes displaying respective icons identifying the remote media items in the list ⟶ 824

The respective icons identifying the remote media items are interactive; and detecting interaction with the affordance corresponding to the respective remote media item includes detecting interaction with the respective icon corresponding to the respective remote media item ⟶ 826

An order of the media items in the list is irrespective of whether a respective media item is a local media item or a remote media item ⟶ 828

The list identifying the media items is ordered by one or more characteristics selected from the set consisting of title, artist or author, album, rating, time, and genre, and wherein the order of the media items in the list is irrespective of which listed media items are local media items and which listed media items are remote media items ⟶ 830

---

Displaying the media library information includes displaying a collections gallery comprising one or more collections, wherein each of a plurality of the media items is associated with a respective collection; and displaying the affordances includes displaying respective icons to identify respective collections that are associated with one or more remote media items ⟶ 832

Detect interaction with an affordance corresponding to a collection having an icon identifying the collection as associated with one or more remote media items ⟶ 834

In response to detecting the interaction, initiate a process for downloading respective copies of at least one of the remote media items associated with the collection to the client device for storage at the client device ⟶ 836

---

Displaying the affordances includes, for a respective collection having one or more remote media items, displaying a number indicating a count of remote media items in the respective collection ⟶ 838

---

One or more of the remote media items are copies of corresponding local media items that have been removed from the client device ⟶ 840

---

One or more of the remote media items correspond to digital media purchases at a digital media store and have no corresponding local media item ⟶ 842

844 — Locally storing at the client device metadata for each media item in the set of media items, the locally stored metadata for a respective media item including storage location information indicating whether the respective media item is locally stored at the client device, and whether the respective media item is remotely stored at the remote system 846 — The locally stored metadata for the respective media item includes a source indicia indicating whether the respective media item was purchased at a predefined digital media store 848 — When the storage location information indicates that a respective media item is locally stored at the client device, the storage location information further indicates whether the respective media item is durably stored at the client device or is cached at the client device 850 — The storage location information for a respective media item includes state information selected from the set consisting of: locally stored, locally cached, remotely stored, and a plurality of transitional states 852 — The plurality of transitional states includes: transitioning to local storage, transitioning to cache, purchase transaction in process, and being deleted from local storage

↓

854 — In response to a predefined trigger condition, initiate synchronization of the locally stored metadata with corresponding metadata stored at the remote system 855 — Update a file path in the metadata for a respective media item when the respective media item is downloaded to the client device 856 — One or more of the remote media items include corresponding copies cached at the client device, wherein the cached copies are subject to eviction from a cache at the client device in accordance with a cache management policy 858 — While displaying the media library information corresponding to the set of media items, suppressing display of remote media items that have been marked as hidden 860 — Receive a user command to delete a respective local media item from the client device and to mark the respective local media item as hidden

862 — Displaying the media library information corresponding to the set of media items is performed while the client device has an online connection to the remote system 863 — When the client device is offline, display the media library information corresponding to the local media items and suppressing display of media library information corresponding to the remote media items stored at the remote system and not at the client device 864 — Displaying the media library information corresponding to the set of media items is performed while the client device has an online connection to the remote system, and one or more of the remote media items stored at the remote system and not at the client device are members of a playlist of one or more media items 865 — When the client device is offline, display the media library information corresponding to the playlist, including displaying the media library information corresponding to the remote media items stored at the remote system and not at the client device with visual indicia identifying the remote media items in the playlist 866 — Displaying the media library information corresponding to the set of media items is performed while the client device has an online connection to the remote system 868 — When the client device is offline, display the media library information corresponding to the set of media items, including:

870 — Display, in accordance with a first predefined formatting, media library information for the one or more local media items stored at the client device 872 — Display, in accordance with a second predefined formatting that is visually distinct from the first predefined formatting, media library information for the one or more remote media items stored at the remote system and not at the client device

> One or more of the local media items has a respective corresponding copy stored at the remote system ⟶ 874

> Determine whether a respective media item is stored at both the client device and the remote system, and display an affordance identifying the respective media item as a remote media item if the respective media item is stored at the remote system and no corresponding copy is stored at the client device ⟶ 876

> The copy of the respective remote media item downloaded to the client device for storage at the client device has one or more predefined quality metrics that are different from the predefined quality metrics of a corresponding previously deleted local media item ⟶ 878

> In response to a predefined user command, replace a respective local media item with a higher quality media item downloaded from the remote system, the higher quality media item having content corresponding to content of the respective local media item ⟶ 880

MANAGEMENT OF LOCAL AND REMOTE MEDIA ITEMS

RELATED APPLICATIONS

This application claims the benefit of U.S. Provisional Application No. 61/525,161, titled "Management of Local and Remote Media Items," filed Aug. 18, 2011, which is incorporated by reference herein in its entirety.

This application is also related to the following U.S. Patent Applications, which are incorporated by reference herein in their entirety:

U.S. Provisional Application No. 61/493,321, titled "Management of Network-Based Digital Data Repository," filed Jun. 3, 2011;

U.S. Provisional Application No. 61/525,177, titled "Management of Network-Based Digital Data Repository," filed Aug. 18, 2011;

U.S. patent application Ser. No. 13/488,339, titled "Management of Network-Based Digital Data Repository," filed Jun. 4, 2012;

U.S. patent application Ser. No. 13/488,336, titled "Management of Network-Based Digital Data Repository," filed Jun. 4, 2012;

U.S. patent application Ser. No. 13/488,317, titled "Remote Storage of Acquired Data at Network-Based Repository," filed Jun. 4, 2012; and U.S. patent application Ser. No. 13/488,320, titled "Regulated Access to Network-Based Digital Data Repository," filed Jun. 4, 2012.

TECHNICAL FIELD

This application relates generally to management of media items.

BACKGROUND

Purchase and consumption of digital content, such as music and movies, has grown to the point where it rivals traditional media, such as physical disks. Further, the spread of mobile devices have further opened up opportunities for consumption of digital content on the go as well as at home.

However, with users having more and more devices per person, management of the digital content on such devices is becoming more tedious and difficult. As the purchase and storage of digital content on a user's devices, for example a home computer and a smartphone, diverge, the digital content libraries on the devices diverge as well. To ensure comprehensive access to his digital content library, a user has to synchronize the digital content libraries and files across his devices, which can be time-consuming and tedious.

SUMMARY

In accordance with some embodiments, a method is performed at a client device with a display. The method includes: displaying media library information corresponding to a set of media items, the media items including: one or more local media items, the on or more local media items including media items stored at the client device, and one or more remote media items, the one or more remote media items including media items stored at a remote system and not at the client device; displaying, concurrently with displaying the media library information, affordances identifying the remote media items; detecting a user command to activate playback of a respective remote media item; in response to detecting the user command, initiating a process for playing the respective remote media item, including: downloading a copy of the respective remote media item from the remote system to a cache at the client device, and playing the copy of the respective remote media item in the cache; and maintaining the affordance with respect to the respective remote media item.

In accordance with some embodiments, a method is performed at a client device with a display. The method includes: displaying media library information corresponding to a set of media items, the media items including: one or more local media items, the one or more local media items comprising media items stored at the client device, and one or more remote media items, the one or more remote media items comprising media items stored at a remote system and not at the client device displaying, concurrently with displaying the media library information, affordances identifying the remote media items; detecting user interaction with an affordance identifying a respective remote media item; and, in response to detecting the user interaction, initiating a process for downloading a copy of the respective remote media item to the diem device for storage at the client device.

In accordance with some embodiments, a method is performed at a client device with a display. The method includes: displaying media library information corresponding to a set of media items, the media items including: one or more media items stored at the client device, and one or more media items stored at a remote system and not at the client device; displaying, concurrently with displaying the media library information, affordances identifying the media items stored at a remote system; detecting a user command to activate playback of a respective media item stored at a remote system; in response to detecting the user command, initiating a process for playing the respective media item stored at a remote system, including: downloading a copy of the respective media item stored at a remote system from the remote system to a cache at the client device, and playing the copy of the respective media item in the cache; and maintaining the affordance with respect to the respective media item stored at a remote system.

In accordance with some embodiments, a method is performed at a client device with a display. The method includes: displaying media library information corresponding to a set of media items, the media items including: one or more media items stored at the client device, and one or more media items stored at a remote system and not at the client device; displaying, concurrently with displaying the media library information, affordances identifying the media items stored at a remote system, detecting user interaction with an affordance identifying a respective media item stored at a remote system; and in response to detecting the user interaction, initiating a process for downloading a copy of the respective media item stored at a remote system to the client device for storage at the client device.

In accordance with some embodiments, a client device includes a display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a client device with a display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a client device with a display, cause the device to perform the operations of any of the methods described above. In accordance with some embodiments, a client device includes: a display; and means for performing the operations of any of the methods described above. In accordance with some embodiments, an information processing apparatus, for use in a client device with a display, includes means for performing the operations of any of the methods described above.

In accordance with some embodiments, a method is performed at a server device. The method includes: receiving from a first client device first media library information associated with a user; identifying, based at least on the first media library information: one or more client media items stored at the first client device associated with the user, and one or more server media items, associated with the user, that have no corresponding copy stored at the first client device, including one or more new server media items not included in the first media library information; and sending second media library information to the first client device, the second media library information including information corresponding to the server media items, including the new server media items, and the client media items; wherein the second media library information is sent to the first client device for presentation to the user at the first client device and for replacing or updating the first media library information at the first client device.

In accordance with some embodiments, a server device includes one or more processors, memory, and one or more programs. The one or more programs are stored in the memory and configured to be executed by the one or more processors. The one or more programs include instructions for: receiving from a first client device first media library information associated with user; identifying, based at least on the first media library information: one or more client media items stored at the first client device associated with the user, and one or more server media items, associated with the user, that have no corresponding copy stored at the first client device, including one or more new server media items not included in the first media library information; and sending second media library information to the first client device, the second media library information including information corresponding to the server media items, including the new server media items, and the client media items; wherein the second media library information is sent to the first client device for presentation to the user at the first client device and for replacing or updating the first media library information at the first client device.

In accordance with some embodiments, a computer readable storage medium has stored therein instructions which when executed by a server device, cause the device to: receive from a first client device first media library information associated with a user; identify, based at least on the first media library information: one or more client media items stored at the first client device associated with the user, and one or more server media items, associated with the user, that have no corresponding copy stored at the first client device, including one or more new server media items not included in the first media library information; and send second media library information to the first client device, the second media library information including information corresponding to the server media items, including the new server media items, and the client media items; wherein the second media library information is sent to the first client device for presentation to the user at the first client device and for replacing or updating the first media library information at the first client device.

In accordance with some embodiments, a server device includes: means for receiving from a first client device first media library information associated with a user; means for identifying, based at least on the first media library information: one or more client media items stored at the first client device, associated with the user, and one or more server media items, associated with the user, that have no corresponding copy stored at the first client device, including one or more new server media items not included in the first media library information; and means for sending second media library information to the first client device, the second media library information including information corresponding to the server media items, including the new server media items, and the client media items; wherein the second media library information is sent to the first client device for presentation to the user at the first client device and for replacing or updating the first media library information at the first client device.

In accordance with some embodiments, an information processing apparatus for use in a server device includes: means for receiving from a first client device first media library information associated with a user; means for identifying, based at least on the first media library information: one or more client media items stored at the first client device associated with the user, and one or more server media items, associated with the user, that have no corresponding copy stored at the first client device, including one or more new server media items not included in the first media library information; and means for sending second media library information to the first client device, the second media library information including information corresponding to the server media items, including the new server media items, and the client media items; wherein the second media library information is sent to the first client device for presentation to the user at the first client device and for replacing or updating the first media library information at the first client device.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

FIGS. 8A-8E are flow diagrams illustrating a method of downloading a media item in accordance with some embodiments.

DESCRIPTION OF EMBODIMENTS

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that various embodiments linty be practiced without these speak details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of on e or more of the associated listed items. It will be further understood that the terms "includes," "including," "comprises," and/or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
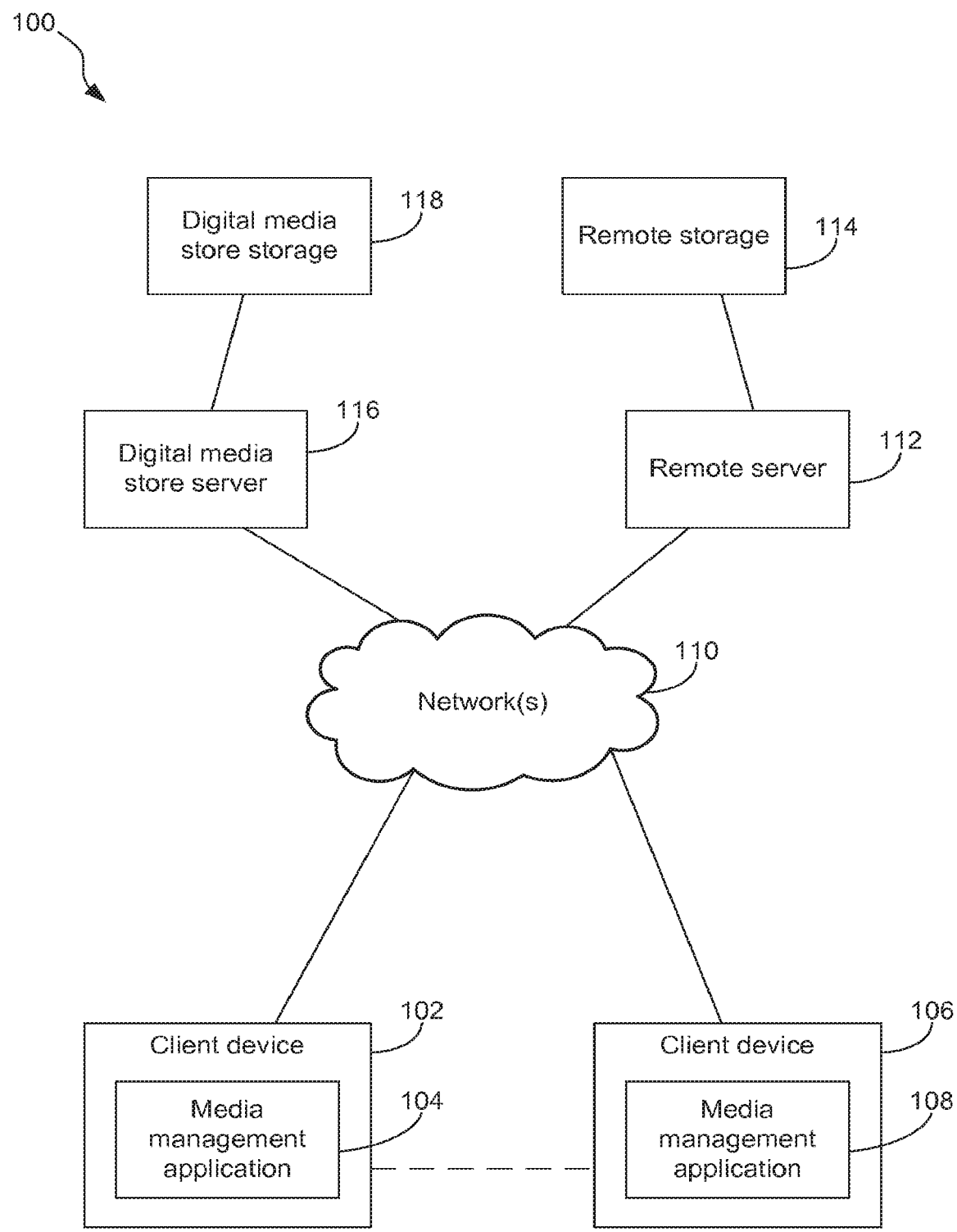
FIG. 1 is a block diagram illustrating a media consumption and acquisition environment in accordance with some embodiments.

FIG. 1 is a block diagram illustrating a media environment 100 in accordance with some embodiments. Media environment 100 includes client devices 102 and 106 associated with a user. In some embodiments, client device 102 is a portable device (e.g., a smartphone, a tablet computer, a portable media player, etc.), and client device 106 is a desktop computer, a laptop computer, or a netbook computer. Client device 102 and 106 may communicate with each other over one or more networks 110 (e.g., wireless networks, local area networks, wide area networks, mobile phone networks, the Internet, etc.) and/or a direct wired or wireless connection (e.g., by Universal Serial Bus (USB), Bluetooth, etc.).

Client devices 102 and 106 include media library 240 (FIG. 2) and media library 340 (FIG. 3), respectively. Both media libraries 240 and 340 are associated with the user. In some implementations, media libraries 240 and 340 are synchronized with each other, and media libraries 240 and 340 are synchronized to a "master" media library, associated with the user, stored elsewhere. In some embodiments, synchronizing media libraries includes synchronizing media library metadata and synchronizing media item files. Between synchronizations, media libraries 240 and 340 may diverge due to different user actions on the respective devices. Client devices 102 and 106 include media management application 104 and 108, respectively, that provide a user interface for managing media libraries stored at the respective devices and for providing an interface to remote server 112 and digital media store server 116. Client device 102 and 106 each communicate with remote server 112 and digital media stoic server 116 over one or more networks 110.

Digital media store server 116 and digital media store storage 118 provide a digital marketplace tor acquiring digital media content. Digital media store server 116 provides a user interface where users, after logging in under their respective user accounts, can browse and/or search for digital media items, acquire digital media items (e.g., for free or for money, depending on the specific item) for addition into a media library, and manage their accounts. Digital media store storage 118 stores the actual media item files. Examples of digital media items include music, podcasts, or other audio, video, e-books, and applications.

Remote server 112 and remote storage 114 provide user-segregated storage space for users to store data, including media libraries and digital media items. Users, after logging into their accounts, may upload data into their reserved storage space in remote storage 114, download data from the storage space, and manage the stored data. Remote server 112 provides an interface for uploading, downloading, and managing the stored data. Remote server 112 and digital media store server 116 communicate with each other, and respectively with client devices 102 and 106 over network(s) 110. Examples of data that may be uploaded to or downloaded from remote storage 114 include digital media items (including items not acquired from digital media store server 116, e.g., music ripped from compact disks), photos, documents, and metadata associated with any of these. Other examples of data uploaded to remote storage 114, and methods for such uploading, are described in U.S. Provisional Patent Application No. 61/493,321, titled "Management of Network-Based Digital Data Repository;" filed Jun. 3, 2011, which is incorporated by reference herein in its entirety.

The user of client devices 102 and 106 have a "master" media library stored at remote storage 114 through remote server 112. The "master" media library (e.g., the user media library 441 (FIG. 4) associated with the user) is the authoritative media library for the user, and includes media items and related data. Client devices 102 and 106 communicate with remote server 112 to synchronize with the user's "master" media library.

In some embodiments, a user uses the same user account for both digital media store server 116 and remote server 112. That is, the user acquires digital media items from digital media store server 116 and store data at remote server 112 under the same credentials, and the acquired digital media items and the stored data are associated with the same user.

In some embodiments, when a user synchronizes media libraries at client device 102 or 106 to the "master" media library at remote server 112, remote server 112 attempts to match the media items at client device 102 or 106 (or at least the media items not already matched) to media items stored at digital media store storage 118. For a match, a reference to the media item stored at digital media store storage 118 is stored at remote storage 114 in lieu of the actual media item file, thus preserving user storage space for other data. Further details about media item matching are disclosed in U.S. Provisional Patent Application No. 61/493,321, titled "Management of Network-Based Digital Data Repository," filed Jun. 3, 2011, which is incorporated by reference herein in its entirety.

Figure 2:
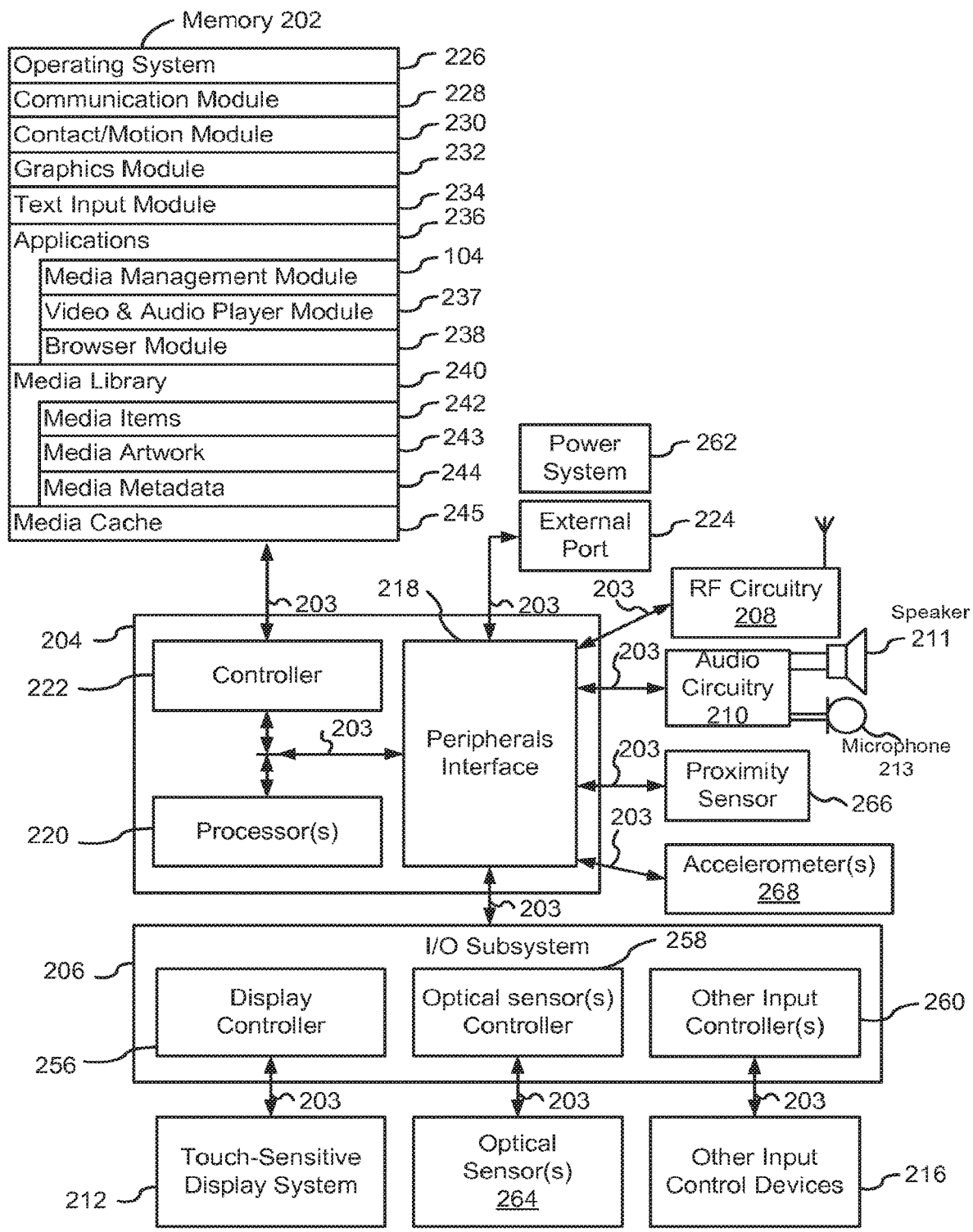
FIG. 2 is a block diagram of an exemplary client device in accordance with some embodiments.

FIG. 2 is a block diagram illustrating client device 102 in accordance with some embodiments. Touch-sensitive display 212 is sometimes called a "touch screen" for convenience, and may also be known as or called a touch-sensitive display system. Device 102 includes memory 202 (which may include one or more computer readable storage mediums), memory controller 222, one or more processing units (CPU's, sometimes called processors) 220, peripherals interface 218, RF circuitry 208, audio circuitry 210, speaker 211, microphone 213, input/output (I/O) subsystem 206, other input or control devices 216, and external port 224. Device 102 optionally includes one or more optical sensors 264. These components communicate over one or more communication buses or signal lines 203.

It should be appreciated that device 102 is only one example of a portable multifunction device, and that device 102 may have more or fewer components than shown, may combine two or more components, or may have a different configuration or arrangement of the components. For example, in some implementations, device 102 has, instead of touch screen 212, a display that is not touch-sensitive, with the user entering input using other input or control devices 216. The various components shown in FIG. 2 are implemented in hardware, software, or a combination of both hardware and software, including one or more signal processing and/or application specific integrated circuits.

Memory 202 includes high-speed random access memory and typically also includes non-volatile memory, such as one or more magnetic disk storage devices, flash memory devices, or other non-volatile solid-state memory devices. Access to memory 202 by other components of device 102, such as CPU 220 and the peripherals interface 218, is optionally (but typically) controlled by memory controller 222.

Peripherals interface 218 can be used to couple input and output peripherals of the device to CPU 220 and memory 202. The one or more processors 220 run or execute various software programs and/or sets of instructions stored in memory 202 to perform various functions for device 102 and to process data.

In same embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 typically includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication uses any of a plurality of communications standards, protocols and technologies including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and for post office protocol (POP)), instant messaging (e.g., extensible messaging and presence protocol (XMPP), Session Initiation Protocol for instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 102. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data is retrieved from and/or transmitted to memory 202 and/or RF circuitry 208 by peripherals interface 218. In some embodiments, audio circuitry 210 also includes a headset jack (not shown). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 102, such as touch screen 212 and other input control devices 216, to peripherals interface 218. In some implementations, I/O subsystem 206 includes display controller 256 and one or more input controllers 260 for other input or control devices. The one or more input controllers 260 receive/send electrical signals from/to other input or control devices 216. The other input control devices 216 optionally include physical buttons (e.g., push buttons, rocker buttons, etc.), dials, slider switches, joysticks, click wheels, and so forth. In some embodiments, input controllers) 260 is coupled to any (or none) of the following: a keyboard, infrared port, USB port, and a pointer device such as a mouse. The one or more physical buttons optionally include an up/down button for volume control of speaker 211 and/or microphone 213. The one or more physical buttons optionally include a push button.

Touch-sensitive display 212 provides an input interface and an output interface between the device and a user. Display controller 256 receives and/or sends electrical signals from/to touch screen 212. Touch screen 212 displays visual output to the user. The visual output typically includes graphics, text, icons, video, and any combination thereof (collectively termed "graphics"). In some embodiments, some or all of the visual output corresponds to user-interface objects.

Touch screen 212 has a touch-sensitive surface, sensor or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and converts the detected contact into interaction with user-interface objects (e.g., one or more soft keys, icons, web pages or images) that are displayed on touch screen 212. In an exemplary embodiment, a point of contact between touch screen 212 and the user corresponds to a finger of the user.

Touch screen 212 typically uses LCD (liquid crystal display) technology, LPD (light emitting polymer display) technology, or LED (light emitting diode) technology, although other display technologies are optionally used in other embodiments. In some implementations, touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone®, iPod Touch®, and iPad® from Apple Inc. of Cupertino, Calif.

Touch screen 212 typically has a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 102 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 102 also includes power system 262 for powering the various components. Power system 262 typically includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, device 102 also includes one or more optical sensors 264. FIG. 2 shows an optical sensor coupled to optical sensor controller 258 in I/O subsystem 206. Optical sensor 264 optionally includes charge-coupled device (CCD) or complementary metal-oxide semiconductor (CMOS) phototransistors. Optical sensor 264 receives light from the environment, projected through one or more lens, and converts the light to data representing an image. In conjunction with imaging module 243 (also called a camera module), optical sensor 264 captures still images or video. In some embodiments, an optical sensor is located on the back of device 102, opposite touch screen display 212 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 102 optionally also includes one or more proximity sensors 266. FIG. 2 shows proximity sensor 266 coupled to peripherals interface 218. Alternately, proximity sensor 266 is coupled to input controller 260 in I/O subsystem 206. In some embodiments, the proximity sensor turns off and disables touch screen 212 when the multifunction device is placed near the user's ear (e.g., when the user is making a phone call).

In some implementations, device 102 also includes one or more accelerometers 268. FIG. 2 shows accelerometer 268 coupled to peripherals interface 218. Alternately, accelerometer 268 is coupled to an input controller 260 in I/O subsystem 206. In some embodiments, information is displayed on the touch screen display in a portrait view or a landscape view based on an analysis of data received from the one or more accelerometers. Device 102 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 102.

In some embodiments, the software components stored in memory 202 include operating system 226, communication module (or set of instructions) 228, contact/motion module (or set of instructions) 230, graphics module (or set of instructions) 232, text input module for set of instructions) 234, and applications (or sets of instructions) 236.

Operating system 226 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 230 detects contact with touch screen 212 (in conjunction with display controller 256) and other touch sensitive devices (e.g., touchpad or physical click wheel). Contact/motion module 230 includes various software components for performing various operations related to detection of contact, such as determining if contact has occurred (e.g., detecting a finger-down event), determining if there is movement of the contact and tracking the movement across the touch-sensitive surface detecting one or more finger-dragging events), and determining if the contact has ceased (e.g., detecting a linger-up event or a break in contact). Contact/motion module 230 receives contact data from the touch-sensitive surface. In some implementations, determining movement of the point of contact, which is represented by a series of contact data, includes determining speed (magnitude), velocity (magnitude and direction), and/or an acceleration (a change in magnitude and/or direction) of the point of contact. These operations are applied to single contacts (e.g., one finger contacts) or to multiple simultaneous contacts (e.g., "multitouch"/multiple finger contacts). In some embodiments, contact/motion module 130 and display controller 256 detect contact on a touchpad.

In some implementations, contact/motion module 230 is configured to detect a gesture input by a user. Different gestures on the touch-sensitive surface have different contact patterns. Thus, a gesture is detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a linger-up (lift off) event.

Graphics module 232 includes various known software components for rendering and displaying graphics on touch screen 212 or other display, including components for changing the intensity of graphics that are displayed. As used herein, the term graphics includes any object that can be displayed to a user, including without limitation text, web pages, icons (such, as user-interface objects including soft keys), digital images, videos, animations and the like.

In some embodiments, graphics module 232 stores data representing graphics to be used. In some implementations, each graphic is assigned a corresponding code. Graphics module 232 receives, from applications etc., one or more codes specifying graphics to be displayed along with, if necessary, coordinate data and other graphic property data, and then generates screen image data to output to display controller 156.

Text input module 234, which is optionally a component of graphics module 232, provides soft keyboards for entering text in various applications (e.g., media management module 104, and any other application that needs text input).

In some implementations, applications 236 include the following modules (or sets of instruction), or a subset or superset thereof:
  media management module 104;
  video and audio player module 237, which is optionally made up of a video player module and an audio player module; and
  browser module 238.

Examples of other applications 236 that may be stored in memory 202 include word processing applications, image editing applications, drawing applications, presentation applications, spreadsheet applications, JAVA-enabled applications, encryption, digital rights management, voice recognition, voice replication, contacts, email, instant messaging, image management, calendar, search, notes, calculator, telephone, video conferencing, etc.

Media management module 104 includes executable instructions to present information on media items (e.g., names, artists, etc., and related artwork) and to activate video and audio player module 237 in accordance with user instructions to play a media item. Media management module 104 also provides user interfaces to remote server 112 and digital media store server 116.

Video and music player module 237 includes executable instructions that allow the user to download and play back recorded music and other sound files stored in one or more file formats, such as MP3 or AAC files, and executable instructions to display, present or otherwise play back videos (e.g., on touch screen 212 or on an external, connected display via external port 224). In some embodiments, device 102 includes the functionality of an MP3 player, such as an iPod (trademark of Apple Inc.).

Browser module 238 includes executable instructions to browse the Internet in accordance with user instructions, including searching, linking to, receiving, and displaying web pages or portions thereof, as well as attachments and other files linked to web pages. In some embodiments, user interfaces to remote server 112 and digital media store server 116 are accessed using browser module 238.

Memory 202 also includes media library 240. Media library 240 includes media items 242, media artwork 243, and media metadata 244. Media items 242 correspond to media items (e.g., music files and/or video files) stored locally at device 102 (in media library 240) and at remote storage 114 (based on an upload) or digital media store storage 118 (based on matching). A respective media item in media library 240, depending on whether a local copy or version is stored at client device 106, is either the actual media item file or a reference to a remotely stored media item file (or, in some implementations, both).

Media artwork 243 includes graphics files (e.g., album cover art) associated with respective media items 242. Media metadata 244 includes metadata (e.g., title, artist, author, album or collection, show, issue, number of playbacks, storage location(s), etc.) associated with media items 242. Media metadata 244 typically includes a respective metadata entry for each distinct media item in media library 240, including locally stored media items and media items that are not locally stored.

Remote media items in a user's media library 240, which are media items other than media items 242 (media items locally stored but also stored at remote storage 114 or digital media store storage 118), are represented by metadata entries in media metadata 244. Those metadata entries provide sufficient information to include these media items (sometimes called "cloud" media items or remote media items) in a listing of the user's media items, to include these media items in playlists, and to access (e.g., to play or download) these media items from the "cloud" g from remote storage 114 or digital media store storage 118).

Optionally, the media metadata entries for media items 242, also specify a media identifier corresponding to media file or object stored at remote storage 114 or digital media store storage 118. Optionally, media metadata entries for media items 242 temporarily stored in media cache 245 (discussed below) include indicia for locating the local copy of these media items in media cache 245 in memory 202).

Memory 202 also includes media cache 245. In some circumstances (e.g., when playing items in a playlist), client device 102 downloads a media item from remote server 112 for playback but not for "permanent" (e.g., non-transient or durable) storage is client device 102. The downloaded media item is cached in media cache 245. Optionally, the cached media is played in later playbacks, from the media cache 245, as long as the media item has not been downloaded from remote server 112 for permanent storage at client device 102. (It is noted that media items downloaded for "permanent" storage can still be deleted, in accordance with an explicit delete command or action by the user, but are not necessarily subject to automatic eviction.) The cached media item is subject to eviction horn media cache 245 in accordance with a cache eviction policy (e.g., a least-recently-used, or "LRU," policy, in which a least recently played media item is evicted first). In some embodiments, a cached media item may be converted to a permanently stored media item (e.g., by copying or moving the cached media item from media cache 245 to permanent storage space in memory 202 for media items 242), rather than the media item being downloaded again.

In some embodiments, media items "permanently" stored in memory 202 are also subject to automatic eviction (e.g., according to an LRU policy; according to a least-frequently-used, or "LFU" policy, in which media items whose respective playback counts are the lowest are evicted). Automatic eviction of such media items helps preserve storage space for the most-consumed media items. Permanently stored media items that are automatically evicted may be re-downloaded into permanent storage. In some other embodiments, media items permanently stored in memory 202 are not subject to automatic eviction. In some implementations, permanently stored media items are subject to automatic eviction from smart phones and tablet computers, which typically have relatively limited storage resources (e.g., memory 202) compared to laptop and desktop computers, but not from client devices such as desktop and laptop computers.

In some implementations, or in some circumstances (e.g., when available storage space at client device 102 falls below a particular threshold), when downloading a media item for caching in media cache 245, a lower-quality (e.g., lower bit-rate) version of the item is downloaded than when the item is downloaded for permanent storage.

In some embodiments, when downloading a media item for permanent storage, client device 102 downloads a lower-quality version of the media item if the network connection to digital media store storage 118 or remote storage 114 is poor-quality or costly (e.g., a per-unit data cost is associated with the network connection). In some such embodiments, when client device 102 is on a free and/or good-quality (e.g., fast) network connection (e.g., Wi-Fi at home), and optionally one or more additional conditions are met (e.g., client device 102 is plugged in for power rather than running on battery, no other application is running on client device 102, the amount of available storage space is above a threshold), client device 102 automatically downloads a higher-quality version of the media item.

In some embodiments, or in some circumstances, when downloading a media item for permanent storage, client device 102 downloads the media item from another client device 102 or 106 within proximity that has the media item (e.g., through an ad-hoc wireless network), rather than from digital media store storage 118 or remote storage 114.

In some embodiments, and/or in some circumstances, a media item is streamed for playback, rather than downloaded to media cache 245 first and played from media cache 245.

Each of the above identified modules, programs or applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 202 stores a subset of the modules and data structures identified above. Furthermore, memory 202 may store additional modules and data structures not described above.

In some embodiments, device 102 is a device where operation of a predefined set of functions on the device is performed exclusively through a touch screen and/or a touchpad. By using a touch screen and/or a touchpad as the primary input control device for operation of device 102, the number of physical input control devices (such as push buttons, dials, and the like) on device 102 is reduced.

In some implementations, the predefined set of functions that are performed exclusively through a touch screen and/or a touchpad include navigation between user interfaces. In some embodiments, the touchpad, when touched by the user, navigates device 102 to a main, home, or root menu from any user interface that may be displayed on device 102. In such embodiments, the touchpad may be referred to as a "menu button." In some other embodiments, the menu button is a physical push button or other physical input control device instead of a touchpad.

Figure 3:
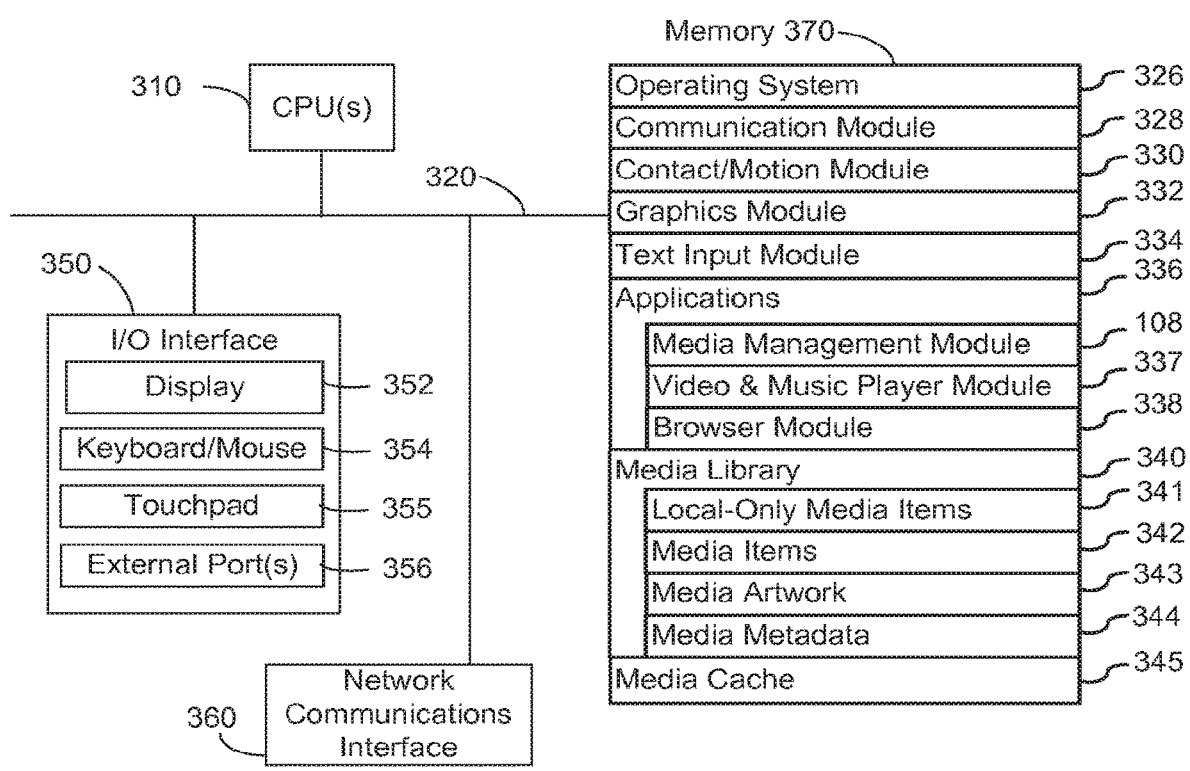
FIG. 3 is a block diagram of an exemplary multifunction device in accordance with some embodiments.

FIG. 3 is a block diagram illustrating client device 106 in accordance with some embodiments. Client device 106 typically includes one or more processing units (CPU's, sometimes called processors) 310, one or more network or other communications interfaces 360, memory 370, I/O interface 350, and one or more communication buses 320 for interconnecting these components. I/O interface 350 may include display 352, keyboard/mouse 354, touch-sensitive surface (e.g., touchpad) 355, and external port(s) 356 for connecting to other external devices).

Memory 370 includes high-speed, random access memory, such as DRAM, SRAM, DDR RAM or other random access solid state memory devices; and optionally includes non-volatile memory, such as one Or Mare magnetic disk storage devices, optical disk storage devices, flash memory devices, or other non-volatile solid state storage devices. Memory 370 optionally includes one or more storage devices remotely located from the CPU(s) 310. Memory 370, or alternately the non-volatile memory device(s) within memory 370, comprises a non-transitory computer readable storage medium. In some implementations, memory 370 or the computer readable storage medium of memory 370 stores the following programs, modules and data structures, or a subset thereof:

operating system 326 that includes procedures for controlling and managing general system tasks (e.g., memory management, storage device control, power management, etc.) and facilitates communication between various hardware and software components;

communication module 328 that is used for connecting the cheat device 106 to other devices or systems (e.g., client device 102, remote server 112, digital media store server 116) via the one or more communication network interfaces 360 (wired or wireless) and one or more communication networks, such as the Internet, other wide area networks, local area networks, metropolitan area networks, and so on;

contact/motion module 330 for performing various operations related to detection of contact, such as determining if contact has occurred (e.g., detecting a finger-down event), determining if there is movement of the contact and tracking the movement across the touch-sensitive surface (e.g., detecting one or more finger-dragging events), determining if the contact has ceased (e.g., detecting a finger-up event of a break in contact), and detecting gestures;

graphics module 337 for rendering and displaying graphics on display 352 or other display, including changing the intensity of graphics that are displayed;

text input module 334, which is optionally a component of graphics module 332, for providing soft keyboards or key mappings for physical keyboards for entering text in various applications;

applications 336;

media library 340; and media cache 345.

Applications 336 may include the following modules (or sets of instructions), or a subset or superset thereof:

media management module 108;

video and audio player module 337, which is optionally made up of a video player module and an audio player module; and browser module 338.

Examples of other applications 336 that may be stored in memory 370 include word processing applications, image editing applications, drawing applications, presentation applications, spreadsheet applications, JAVA-enabled applications, encryption, digital rights management, voice recognition, voice replication, contacts, email, instant messaging, image management, calendar, search, notes, calculator, telephone, video conferencing, etc.

Media management module 108 includes executable instructions to present information on media items (e.g., names, artists, etc., and related artwork) and to activate video and audio player module 337 in accordance with user instructions to play a media item. Media management module 108 also provides user interfaces to remote server 112 and digital media store server 116.

Video and music player module 337 includes executable instructions that allow the user to download and play back recorded music and other sound files stored in one or more file formats, such as MP3 or AAC files, and executable instructions to display, present or otherwise play back videos (e.g., on display 352 or on an external, connected display via external port 356).

Browser module 338 includes executable instructions to browse the Internet in accordance with user instructions, including searching, linking to, receiving, and displaying web pages or portions thereof, as well as attachments and other files linked to web pages. In some embodiments, user interfaces to remote server 112 and digital media store server 116 can be accessed using browser module 338.

Memory 370 also includes media library 340. Media library 340 includes local-only media items 341, media items 342 (described below), media artwork 343, and media metadata 344.

Local-only media items 341 have no corresponding copy or version stored at remote storage 114 or digital media store storage 118. In some embodiments, local only media items 341 include media items that are not eligible for uploading to remote storage 114 or matching based on predefined criteria (e.g., media item file is too large, the media item file is of a specific type, or the quality is too poor), and thus remain local to client device 106.

Media items 342 correspond to media items (e.g., music files and/or video files) stored locally at client 106 (in media library 340) and at remote storage 114 (based on an upload or media store storage 118 (based on matching). A respective media item in a users media library 340, depending on whether a local copy or version is stored at client device 106, is either the actual media item file or a reference to a remotely stored media item file (or, in some implementations, both). In some embodiments, media items 342 also include media items, stored at client device 106, that have not been uploaded to remote storage 114 yet and or have not been matched yet to media items in digital media store storage 118 (e.g., because device 106 is between synchronizations), and thus have no corresponding copy or version stored at remote storage 114 or digital media store storage 118 yet, but are otherwise eligible to be matched and/or uploaded a media item is uploaded if it is eligible for matching but no actual match is found).

Media artwork 343 includes graphics files (e.g., album cover art) associated with respective media items 342 or 341.

Media metadata 344 includes metadata (e.g., title, artist, author, album or collection, show, issue, number of play-backs, storage location(s), etc.) associated with media items 342 and local-only media items 341. Media metadata 344 typically includes a respective metadata entry for each distinct media item in library 340, including locally stored media items and media items that are not locally stored.

Remote media items in a user's media library 340, which are not local-only media items 341 and also not media items 342 (media items locally stored but also stored at remote storage 114 or digital media store storage 118), are represented by metadata entries in media metadata 344. Those metadata entries provide sufficient information to include these media items (sometimes called "cloud" media items or remote media items) in a listing of the user's media items, to include these media hems in playlists, and to access (e.g., to play or download) these media items from the "cloud" (e.g., from remote storage 114 or digital media store storage 118).

Local-only media items 341 and media items 342 together comprise a local media database of locally stored media items in the user's media library. The media metadata entries for the media items in this local media database specify a location (e.g., a file location comprising a path and file name) indicating where in memory 370 these media items are locally stored. Optionally, the media metadata entries for media items 342 also specify a media identifier corresponding to media file or object stored at remote storage 114 or digital media store storage 118. Optionally, the media metadata entries for media items 342 temporarily stored in media cache 345 (discussed below) include indicia for locating the local copy of these media items in media cache 345 (i.e., in memory 370). Typically, the media identifier for each media file or object stored at remote storage 114 is unique with respect to the media identifiers for all other media files or objects stored at remote storage 114. Similarly, the media identifier for each media file or object stored in media cache 345 is unique with respect to the media identifiers for all other media files or objects stored in media cache 345, and the media identifier for each media file or object stored in digital media store storage 118 is unique with respect to the media identifiers for all other media files or objects stored in digital media store storage 118.

Memory 370 also includes media cache 345. As noted above, in some circumstances client device 106 downloads a media item from remote server 112 for playback but not for "permanent" (e.g., non-transient or durable) storage at client device 106. In these circumstances, the downloaded media item is cached in media cache 345. The cached media item can be played (from the media cache 345) in later playbacks as long as the media item has not been downloaded from remote server 112 for permanent storage at client device 106. (It is noted that media items downloaded for "permanent" storage can still be deleted in accordance with an explicit delete command or action by the user, but are no subject to automatic eviction.) The cached media item is subject to eviction from media cache 345 in accordance with a cache eviction policy (e.g., an LRU policy, in which the least recently played media item is evicted first). In some embodiments, or in some circumstances, a cached media item is converted to a permanently stored media item (e.g., by moving or transferring the cached media item from media cache 345 to permanent storage space in memory 370 for media items 342), rather than the media item being downloaded again.

In some embodiments, and/or in some circumstances, when downloading a media item for caching in media cache 345, a lower-quality (e.g., lower bit-rate) version of the item is downloaded than when the item is downloaded for permanent storage.

In some embodiments, and/or in some circumstances, when downloading a media item for permanent storage, client device 106 downloads the media item from another client device 102 or 106 within proximity that has the media item (e.g., through an ad-hoc wireless network), rather than from digital media store storage 118 or remote storage 114.

In some embodiments, and/or in some circumstances, when downloading a media item for permanent storage, client device 106 downloads a lower-quality version of the media item if the network connection to digital media store storage 118 or remote storage 114 is poor-quality or costly (e.g., a per-unit data cost is associated with the network connection). When client device 106 is on a free and/or good-quality (e.g., fast) network connection, and optionally one or more additional conditions are met (e.g., client device 106 is plugged in for power rather than running on battery, no other application is running on client device 106, the amount of available storage space is above a threshold), client device 106 automatically downloads a higher-quality version of the media item.

Each of the above identified modules, programs or applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 370 stores a subset of the modules and data structures identified above. Furthermore, memory 370 may store additional modules and data structures not described above.

Figure 4:
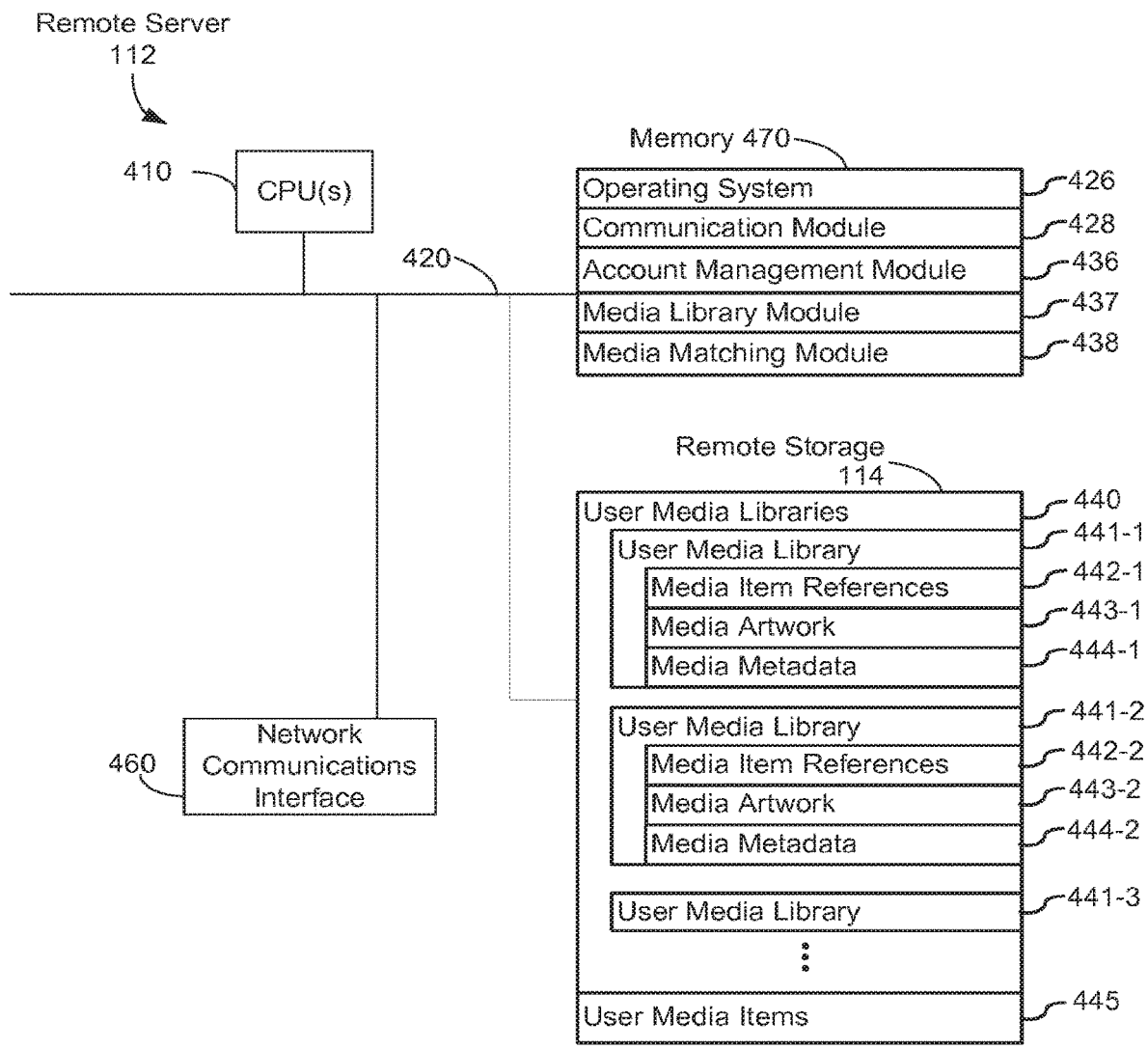
FIG. 4 is a block diagram of a remote server and remote storage in accordance with some embodiments.

FIG. 4 is a block diagram illustrating remote server 112 and remote storage 114 in accordance with some embodiments. Remote server 112 typically includes one or more processing units (CPU's, sometimes called processors) 410, one or more network or other communications interfaces 460, memory 470, and one or more communication buses 420 for interconnecting these components.

Memory 470 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from the CPU(s) 410. Memory 470, or alternately the non-volatile memory device(s) within memory 470, comprises a non-transitory computer readable storage medium. In some implementations, memory 470 or the computer readable storage medium of memory 470 stores the following programs, modules and data structures, or a subset thereof:

- operating system 426 that includes procedures for controlling and managing general system tasks (e.g., memory management, storage device control, power management, etc.) and facilitates communication between various hardware and software components;
- communication module 428 that is used for connecting remove server 112 to other devices or systems (e.g., client devices 102 and 106, digital media store server 116) via the one or more communication network interfaces 460 (wired or wireless) and one or more communication networks, such as the Internet, other wide area networks, local area networks, metropolitan area networks, and so on;
- account management module 436 for providing processes and interfaces for managing user accounts;
- media library module 437 for performing synchronization operations and other processes with respect to media libraries and for accessing media libraries stored in remote storage 114; and
- media matching module 438 for performing operations, in conjunction with media matching module 538 at digital media store server 116, for matching media items on client devices 102 and 106 to media items stored at digital media store storage 118.

Remote storage 114 includes user media libraries 440 and user media items 445. User media items are media item files that are uploaded from cheat devices (e.g., client devices 102, 106) for storage at remote storage 114. In some implementations, a media library associated with a particular user 441 or user account includes media item references 442, media artwork 443, and media metadata 444.

Media item references 442 include one or more of: references to user media items 445 that belong to the user, references to media items in digital media store storage 118 that were acquired (e.g., purchased) by the user or matched to media items on the user's client devices 102 and 106, and references to media items stored locally at cheat devices 102 and 106 (whether they are corresponding copies or versions of media items stored at storage 114 or 118, or are local to the cheat devices). In some embodiments, media item references 442 may refer to a media item, depending on where the media item is stored, by path or media identifier (sometimes called an identifier number, even if the identifier is, strictly speaking, a string of characters). Media artwork 443 is graphics files (e.g., album cover art) associated with respective media items referenced by media item references 442. Optionally, media artwork 443 includes additional graphics files not currently associated with respective media items. Media metadata 444 are metadata (e.g., title, artist, author, album or collection, show, issue, number of playbacks, etc.) associated with media items referenced by media item references 442.

It should be appreciated that, while remote server 112 is sometimes described m tins application as a single server or single server system, a distributed system of server computers may be used to implement the functionality of remote server 112. The description of remote server 112 as a single server is merely for convenience and ease of understanding.

Further, while remote storage 114 is depicted as accessed through communication buses 420, remote storage 114 may, in some embodiments, be distributed, network-accessed storage that is accessed by remote server 112 through network(s) 110, or some other form of distributed storage.

Figure 5:
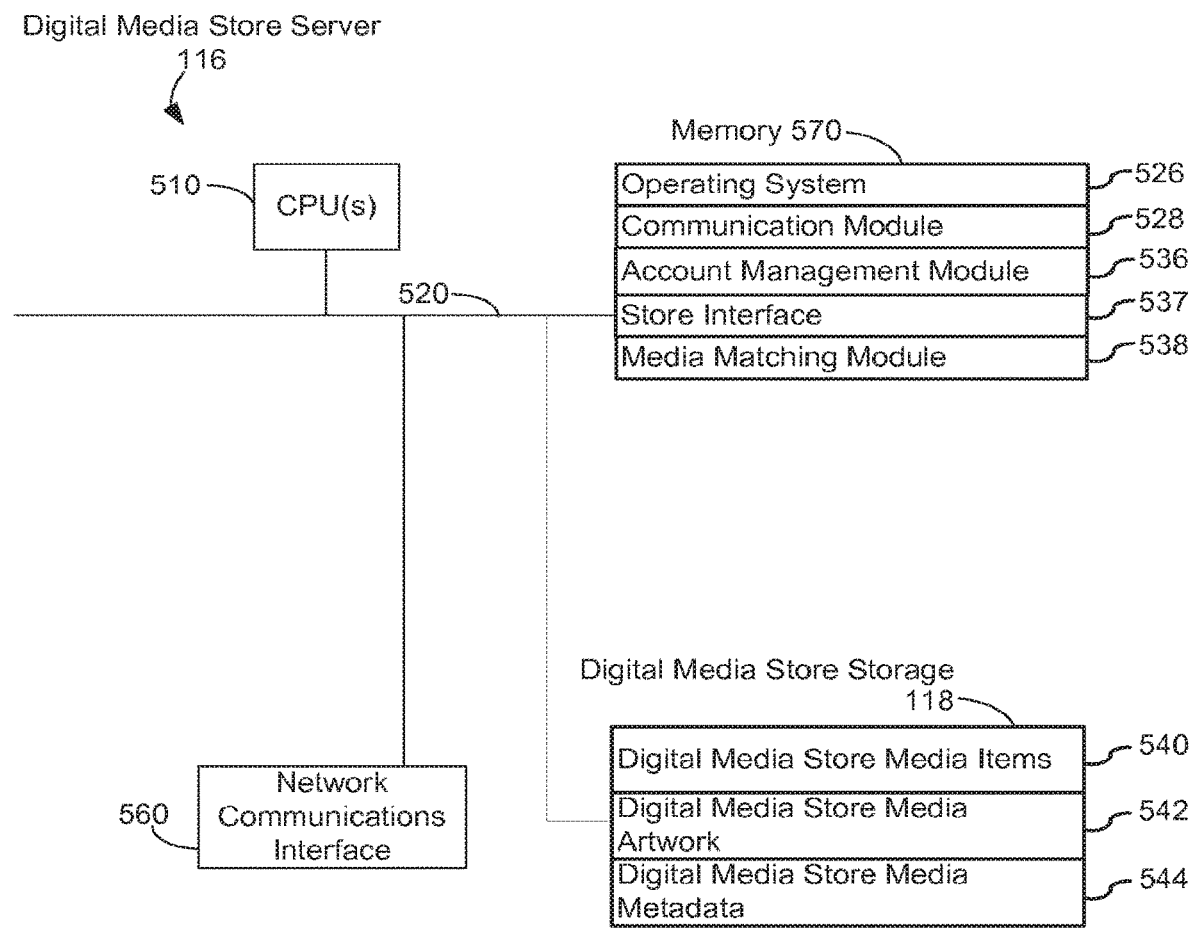
FIG. 5 is a block diagram of a digital media store server and digital media store storage in accordance with some embodiments.

FIG. 5 is a block diagram illustrating digital media store server 116 and digital media store storage 118 in accordance with some embodiments. Digital media store server 116 typically includes one or more processing units (CPU's, sometimes called processors) 510, one or more network or other communications interfaces 560, memory 570, and one or more communication buses 520 for interconnecting these components.

Memory 570 includes high-speed random access memory, such as DRAM, SRAM, DDR RAM or other random access solid state memory devices; and optionally includes non-volatile memory, such as one or mote magnetic disk storage devices, optical disk storage devices, flash memory devices, or other non-volatile solid state storage devices. Memory 570 optionally includes one or more storage devices remotely located from the CPU(s) 510. Memory 570, or alternately the non-volatile memory device(s) within memory 570, comprises a non-transitory computer readable storage medium. In some implementations, memory 570 or the computer readable storage medium of memory 570 stores the following programs, modules and data structures, or a subset thereof:
- operating system 526 that includes procedures for controlling and managing general system tasks (e.g., memory management, storage device control, power management, etc.) and facilitates communication between various hardware and software components;
- communication module 528 that is used for connecting digital media store server 116 to other devices or systems (e.g., client devices 102 and 106, remote server 112) via the one or more communication network interfaces 560 (wired or wireless) and one or more communication networks, such as the Internet, other wide area networks, local area networks, metropolitan area networks, and so on;
- account management module 536 for providing processes and interfaces for managing user accounts;
- store interface 537 for providing a interface for users to browse, search for, and acquire digital media items; and
- media matching module 538 for performing operations for matching media items on client devices 102 and 106 to media items stored at digital media store storage 118.

Digital media store storage 118 includes digital store media items 540, digital media store media artwork 542, and digital media store media metadata 544.

Digital media store media items 540 are media items that are offered for purchase or other acquisition by digital media store server 116. Digital media store media artwork 542 is graphics files (e.g., album cover art) associated with respective digital media store media items 540. Optionally, media artwork 542 includes additional graphics files not currently associated with respective media items. Digital media store media metadata 544 are metadata (e.g., title, artist, author, album or collection, show, issue, number of playbacks, etc.) associated with digital media store media items 540.

It should be appreciated that, while digital media store server 116 is described in this application as a single server or single server system, a distributed system of server computers may be used to implement the functionality of digital media store server 116. The description of digital media store server 116 as a single server is merely for convenience and ease of understanding. Further, while digital media store storage 118 is depicted as accessed through communication buses 520, digital media store storage 118 may, in some embodiments, be distributed, network-accessed storage that is accessed by digital media store server 118 through network(s) 110, or some other form of distributed storage.

As described above, client devices 102 and 106 include media libraries 240 and 340, respectively, which synchronized from time to time to the user's user media library 441. Media library 240 when synchronized with user media library 441, mirrors user media library $41 and includes the same media items as in user media library 441. Media library 240, stored at client device 102, has local copies or versions of some or all of the media items in user media library 441, and the remainder refers to the remotely stored copies or versions. In some implementations, media library 240 is still functional even if no local copies of the media items in the user's media library 441 are stored at the client device, because it includes metadata for the media items in the user's media library 441, thereby enabling those items to be accessed (e.g., for playback or download, for creation and management of playlists that include these items.

Media library 340, when synchronized with user media library 441, mirrors user media library 441 and includes the same media items as in user media library 441. In some embodiments, media library 340 may have, stored at client device 106, local copies or versions of some or all of the media items in user media library 441, and the remainder refers to the remotely stored copies or versions. Media library 340 optionally includes some media items that are local to client device 106, that cannot be uploaded or matched, and that otherwise have no corresponding copy or version in remote storage 114 or digital media store storage 118. In some embodiments, these local media items not in user media library 441, are indicated in user media library 441 as local to a client device.

In some embodiments, when user media library 441 for a specific user is updated, remote server 112 sends a push notification to client devices (e.g., devices 102, 106) associated with the specific user to synchronize media libraries, so that media libraries 240 and 340 on the client devices are synchronized with the updated user media library 441.

In some embodiments, when synchronizing media library 240 or 340 with user media library 441 for a specific user, the synchronization is an incremental synchronization. During an incremental synchronization, client device 103 or 106 receives just the differences between media library 240 or 340 and the current user media library 441 for the specific user.

User Interfaces and Associated Processes

Figure 6A:
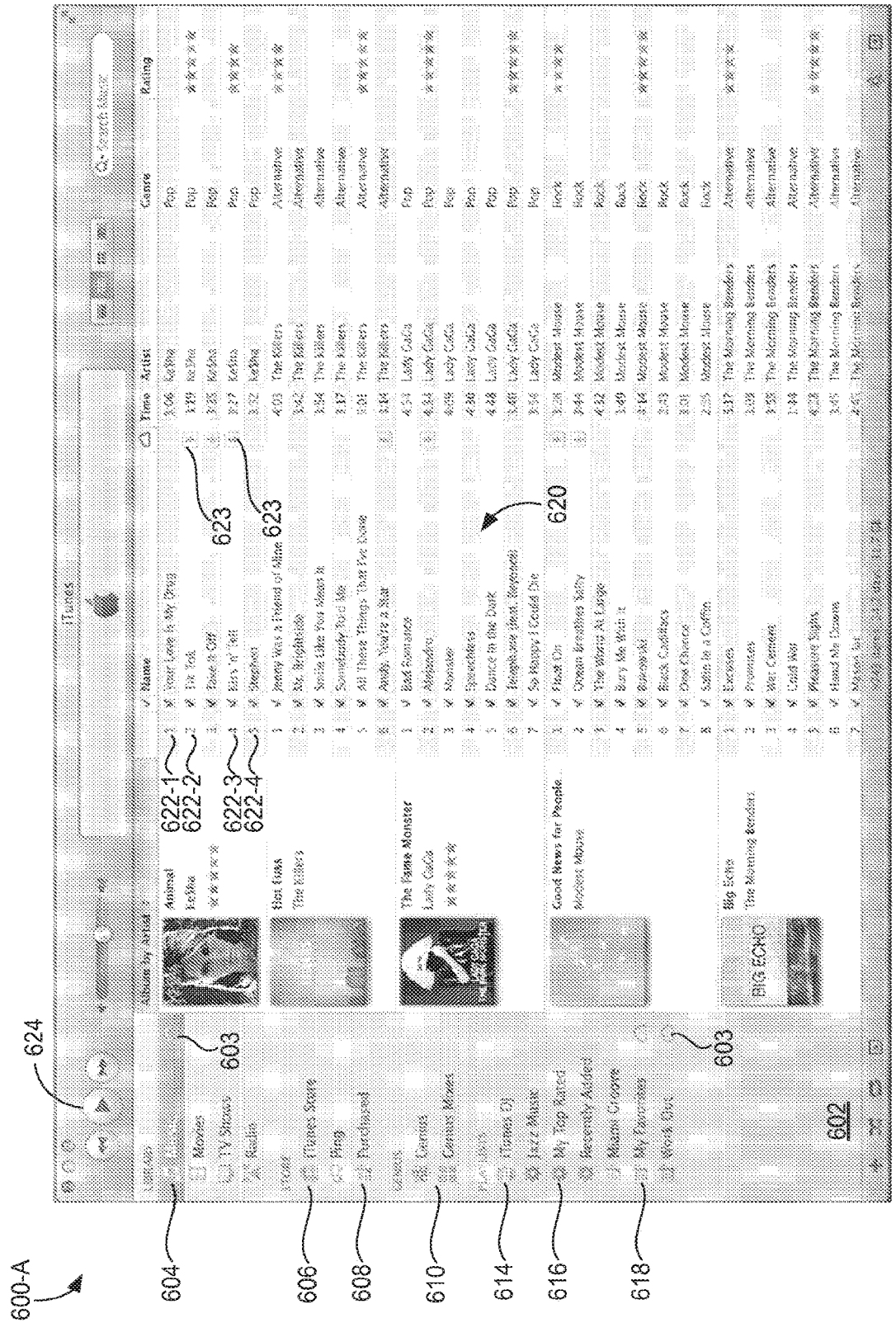
FIGS. 6A-6E illustrate exemplary user interfaces for managing media items in accordance with some embodiments.

FIGS. 6A-6E illustrate exemplary user interfaces for managing media items in accordance with some embodiments. FIG. 6A illustrates user interface 600-A of media management application 108 at client device 100. User interface 600-A includes sidebar 602 (sometimes called the source list) with links to various aspects of the user's media library, a digital media store, and playlists. Links to aspects of the user's media library include, for example, music link 604 that links to a display of the user's music media items in the user's media library 340 (e.g., media items list 620 or albums gallery 626, FIG. 6B). While this example shows a music media list, other implementations, the media list includes one or more other media types, such as movies, shows, ebooks, magazines, etc.

In some embodiments, cloud icon 603 is displayed alongside music link 604 (or more generally, a media link) if media library 340 includes media items that are not stored locally (i.e., stored at remote storage 114 or digital media storage 118). In some implementations, "media items that are not stored locally" includes media items stored in media cache 345 (FIG. 3), but not in media library 340, and in such implementations cloud icon 603 is displayed alongside music link 604 even it every media item in the user's account is stored in either media library 340 or media cache 345, so long as at least one media item in the user's account is not stored in media library 340.

Sidebar 602 also includes a link 606 to a digital media store provided by digital media store server 116, and a link to a playlist 608 of media items acquired through the digital media store.

Sidebar 602 also includes links to various playlists, including links 610 to computer generated playlists, generated based on analysis of music media items and similarities between music media items, a link 614 to a randomly-generated playlist, links 616 to playlists that are generated in accordance with user-specified or predefined rules, and links 618 to user-defined (e.g., the user directly selects the media items to be included) playlists. In some embodiments, cloud icon 603 is displayed alongside a playlist link if media library 340 includes media items that are not stored locally at client device 102 or 106. In some embodiments, playlists 610, 614, and 616 are generated by, depending on the circumstances, media management application 104 at client device 102 or digital media store server 116.

Music media items list 620 lists music media items 622 in media library 340. Typically, the music media items are listed in alphabetical order by song name, by album name, by artist name, by artist by album, by genre, by rating, oi the like. For example, as depicted in FIG. 6A, list 620 displays the list of music media items organized by album by artist.

Icon 623 (sometimes called an affordance, download icon or download affordance) displayed is displayed alongside music media items 622 that are not stored locally (i.e., music media items that are stored at remote storage 114 or digital media store storage 118, but that are not locally stored in media library 340). In some embodiments, the user may interact with icon 623 for a particular remotely stored music media item 622 to initiate a download of that item for local storage at client device 106. For example, items 622-2 and 622-3 are not locally stored, but a copy may be downloaded for local storage by clicking on (or otherwise selecting) the corresponding icon 623. In this context, local storage means durable or permanent storage at client device 106, in contrast to being temporarily cached in media cache 345. In some embodiments, icon 623 is displayed persistently to indicate storage status (e.g., locally stored, remotely stored, or cached) of the corresponding item. Icon 623 may have a different appearance depending on the storage status of the corresponding item. If an item is not locally stored, the user may select the corresponding icon 623 to initiate download of the item, as described above. When the download is complete, the corresponding icon 623 changes appearance to reflect the new storage status.

Music media items 622 that are locally stored do not have icon 623. For example, items 622-1 and 622-4 are locally stored. In some embodiments, music media items 622 may have additional statuses, and icons corresponding to the additional status may be displayed for such items. For example, an icon may be displayed for a remotely stored item that is inaccessible because client device 106 is offline. As another example, an icon may be displayed for an item that is exclusively local to client device 106 (e.g., because the item is ineligible for upload or matching).

Music media items 622 may also be played from user interface 600-A. For example, the user may select a music media item 622 and activate playback button 624 to play the selected item. If the played item is a remotely stored item (e.g., item 622-2 or item 622-3, the item is downloaded from remote storage 114 or digital media store storage 118 and cached in media cache 345, and the cached item is played. As media cache 345 is not permanent storage, in the sense that items in the cache are subject to eviction (i.e., deletion) in accordance with predefined eviction rules or criteria, the item is still considered as not locally stored.

Figure 6B:
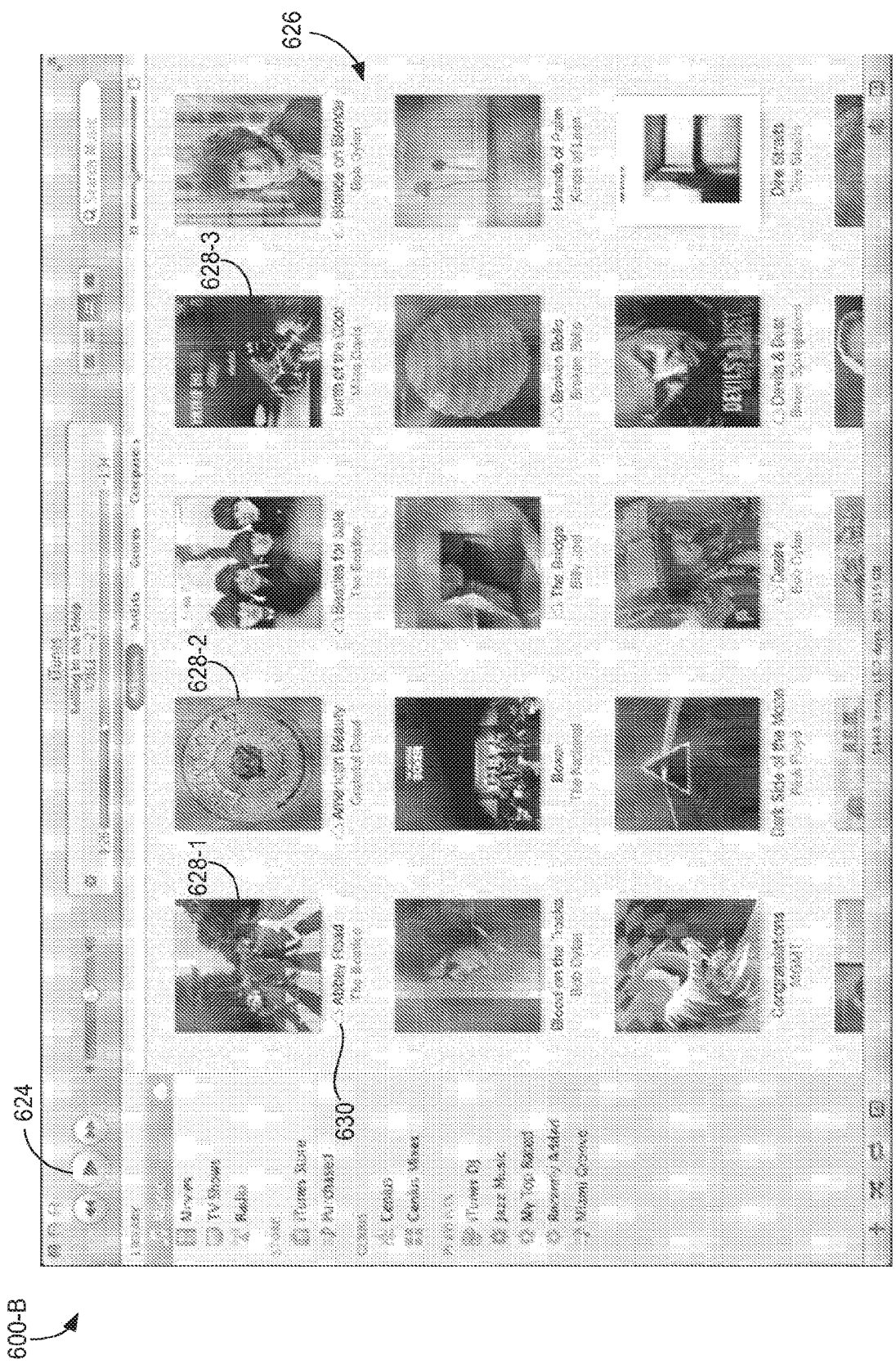

FIG. 6B illustrates user interface 600-B of media management application 108 at client device 106. User interface 600-B shows gallery 626 of collections 628 of music media items. In some embodiments, a collection of music media items is an album, a collection of music media items by the same artist, a playlist, a genre, etc. in FIG. 6B, collections 628 are albums. Icon 630 is displayed for collections 628 that include at least one music media item that is not locally stored. For example, collections 628-1 and 628-2 each have one or more music media items that are not stored, and collection 628-3 has all of its music media items locally stored.

In user into 600-B, a user may select a collection to display the items in the collection, and to activate playback of the items. If the collection includes items that are not locally stored, the user may download them (some or all) and play them (e.g., by selecting the item and clicking on play button 624). As discussed above, when an item that is not locally stored is played, the item is downloaded and cached in media cache 345, and is still considered not locally stored.

Figure 6C:
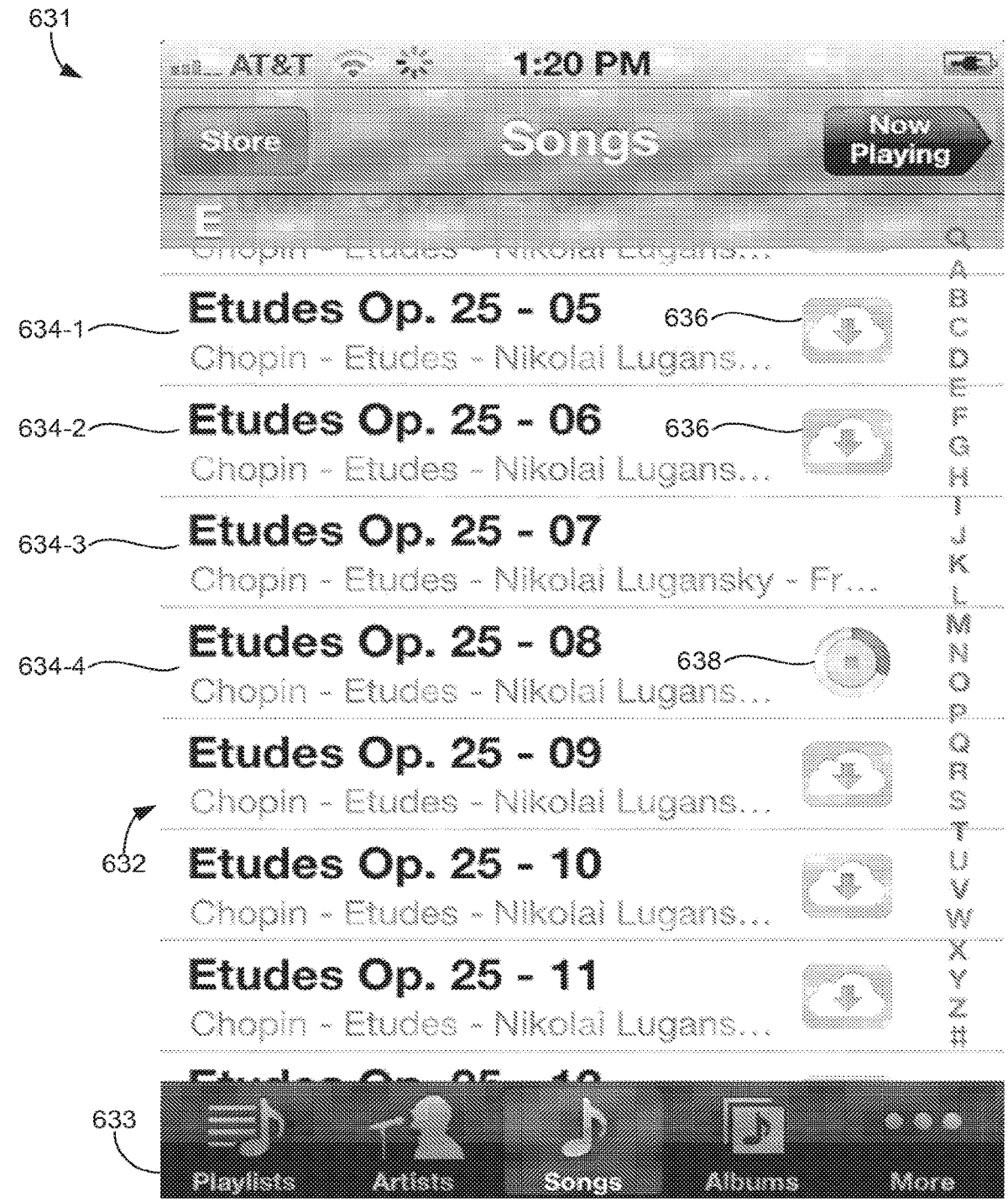

FIG. 6C illustrates user interface 631 of media management application 104 at client device 102. Songs (i.e., music media items) list 632 is displayed in user interface 631. Also displayed in user interface 631 is bar 633 where the user may select one of multiple ways to have music media items displayed (e.g., by collection, by playlist, by artist, or by album).

Music media items 634 are listed in songs list 632. Music media items that are not locally stored at client device 102, such as items 634-1 and 634-2, have icon 636 (sometimes called an affordance, download icon or download affordance) displayed alongside. In some embodiments, icon 636 is interactive; the user may select icon 636 (e.g., by tapping on icon 636 on touch screen 212) to initiate download of the corresponding item 634 to client device 102 for permanent storage. When the download of an item for permanent storage is in progress, as is the case for item 634-4, icon 638 is displayed. Icon 638 includes a stop download button surrounded by a circular progress bar. The circular progress bar indicates the progress of the download, and the stop download button may be selected (e.g., by tapping on icon 638 on touch screen 212) to stop the download. Item 634-3, on the other hand, corresponding to a locally (permanently) stored media item, and icon 636 is not displayed for that media item. In some embodiments, icon 636 is displayed persistently to indicate storage status (e.g., locally stored, remotely stored, or cached) of the corresponding item. Icon 636 may have a different appearance depending on the storage status of the corresponding item, if an item is not locally stored, the user may select the corresponding icon 636 to initiate download of the item, as described above. When the download is complete, the corresponding icon 636 changes appearance to reflect the new storage status.

Figure 6D:
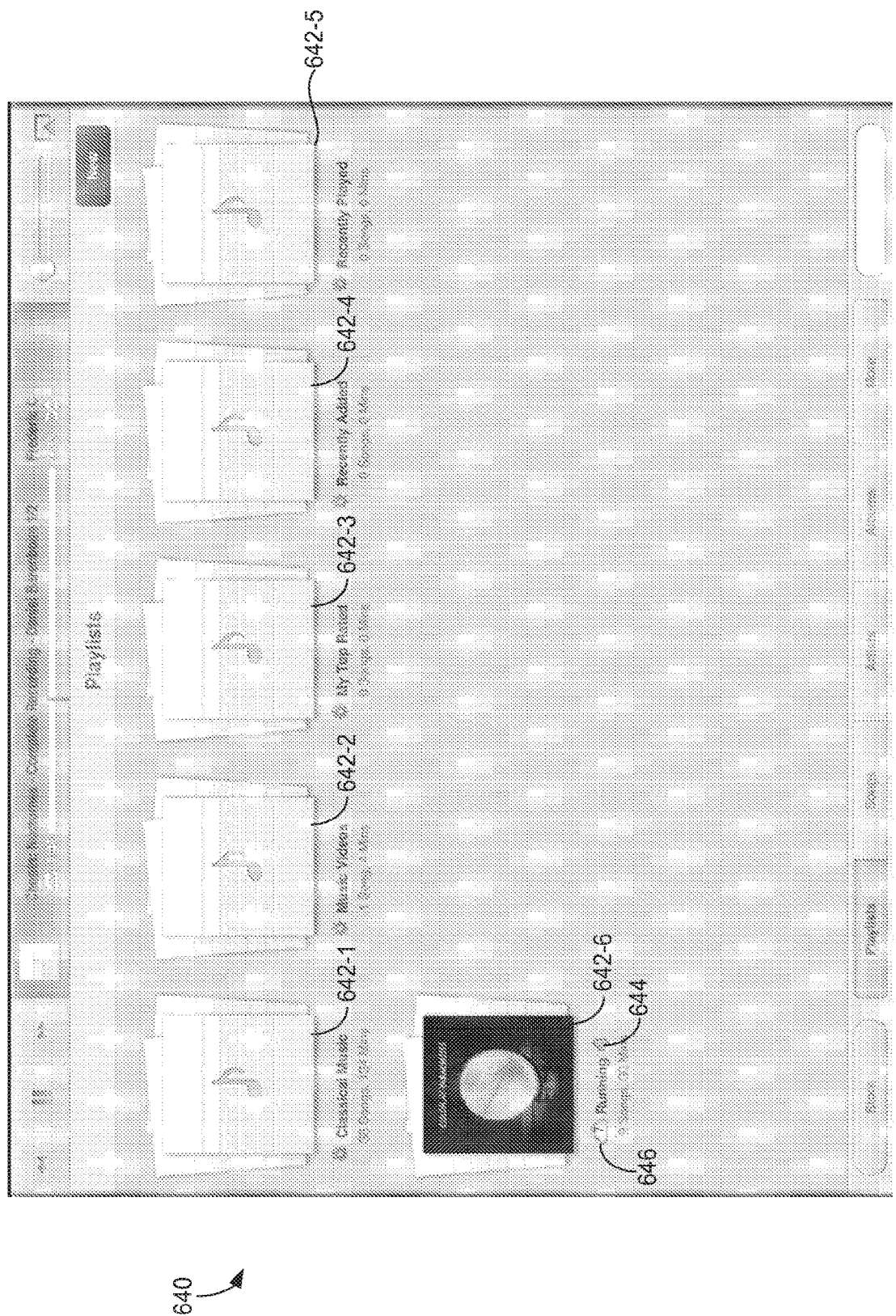

FIG. 6D illustrates user interlace 640 of media management application 104 in client device 102, where client device 102 here has a larger form factor (e.g., as in a tablet or laptop computer) than that depicted in FIG. 6C (e.g., as in a smartphone). A playlist gallery of playlists 642 is displayed in user interface 640. Icon 644 is displayed for a playlist whose music media items are being played (e.g., playlist 642-6). Icon 646 is displayed for a playlist that includes one or more music media items that are not locally stored. In some embodiments, a number of music media items in the playlist that are not locally stored is displayed within icon 646. For example, icon 646 in FIG. 6D includes a number "7," indicating that seven items in playlist 642-6 are not locally stored. The items in a playlist may be displayed in response to a user selection of a playlist. (e.g., by tapping on the playlist on touch screen 212).

Figure 6E:
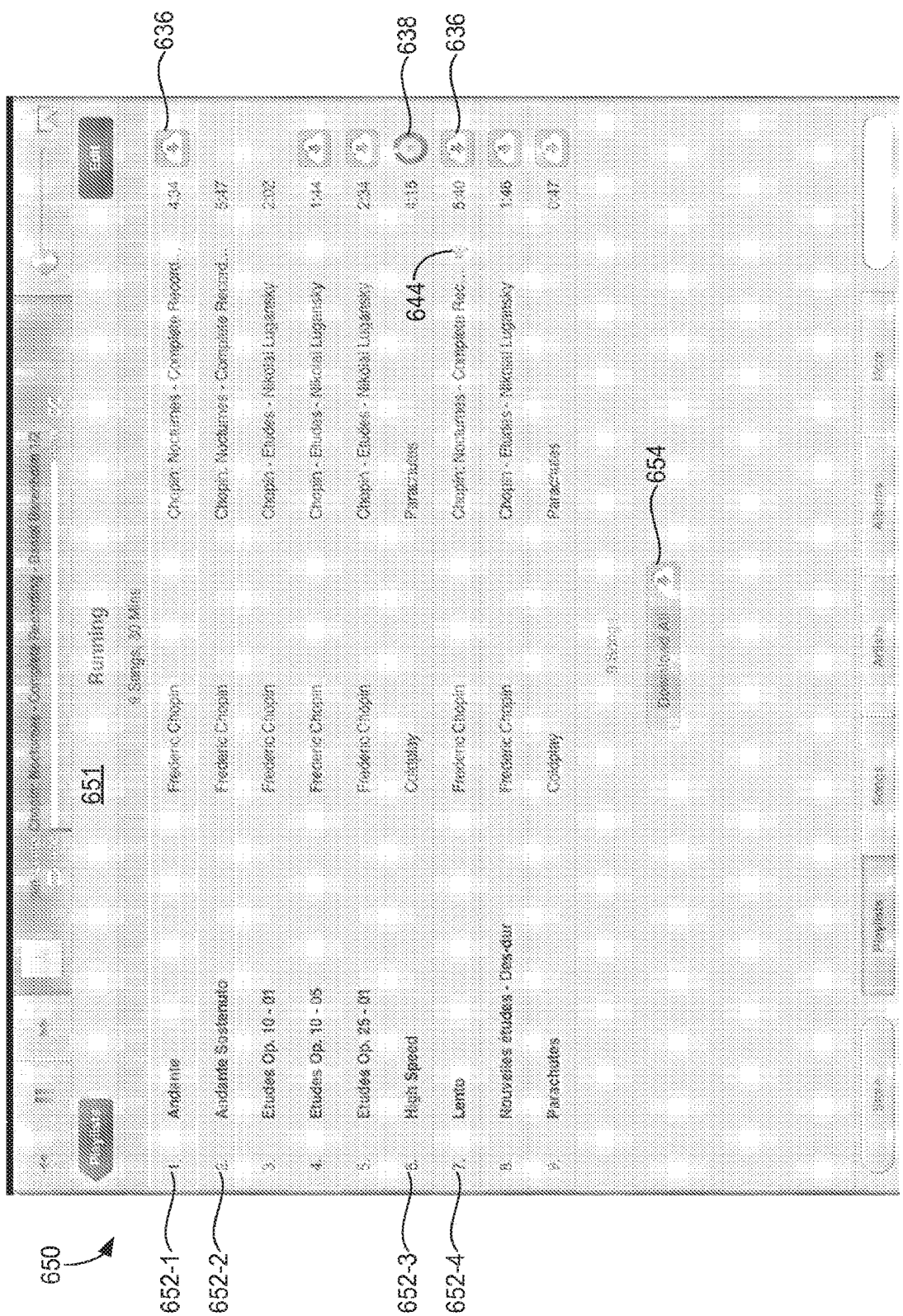

FIG. 6E illustrates user interface 650 of media management application 104 in client device 102, where client device 102 here has a larger form factor (e.g., as in a tablet or laptop computer) than that depicted in FIG. 6C (e.g., as in a smartphone). FIG. 6E, the contents of playlist 642-6 is displayed in list 651 in user interface 650, Playlist items list 651 includes music media items 652. Icon 636 is displayed for (e.g., within or adjacent to) items 652 that are not locally stored, such as items 652-1 and 652-4. In some embodiments, icon 636 is an interactive affordance; the user may select icon 636 (e.g., by tapping on icon 636 on touch screen 212) to initiate download of the corresponding item 652 to diem device 102 for permanent storage. When the download of an item for permanent storage is in progress, as is the case for item 652-3, icon 638 is displayed. Icon 638 includes a stop download button surrounded by a circular progress bar. The circular progress bar indicates the progress of the download, and the stop download button, may be selected (e.g., by tapping on icon 638 on touch screen 212) to stop the download. Item 652-2, on the other hand, corresponds to a locally (permanently) stored media item, and icon 636 is not displayed for that media item.

Icon 644 (sometimes called a playback icon) is displayed for item 652-4; item 652-4 is being played back even though it is not locally stored. Item 652-4 is downloaded into media cache 245, and the cached item is played. Also, it should be appreciated that an item that is not locally stored may be played while the same or another not-locally-stored item is being downloaded for permanent storage. For example, in FIG. 6E, item 652-3 is being downloaded and item 652-4 is being played concurrently.

In some implementations, user interface 650 includes a "download all" button 654. A user may select "download all" button 654 (e.g., by tapping on icon 654 on touch screen 212) to start download, for permanent storage, of items in the displayed playlist that are not, locally stored (e.g., item 652-4). The user may also select individual icons 636 to download the corresponding media items individually. In some embodiments, "download all" button 654 is displayed for collections (e.g., albums) that have one or more media items that are remotely stored and not locally stored.

Figure 7:
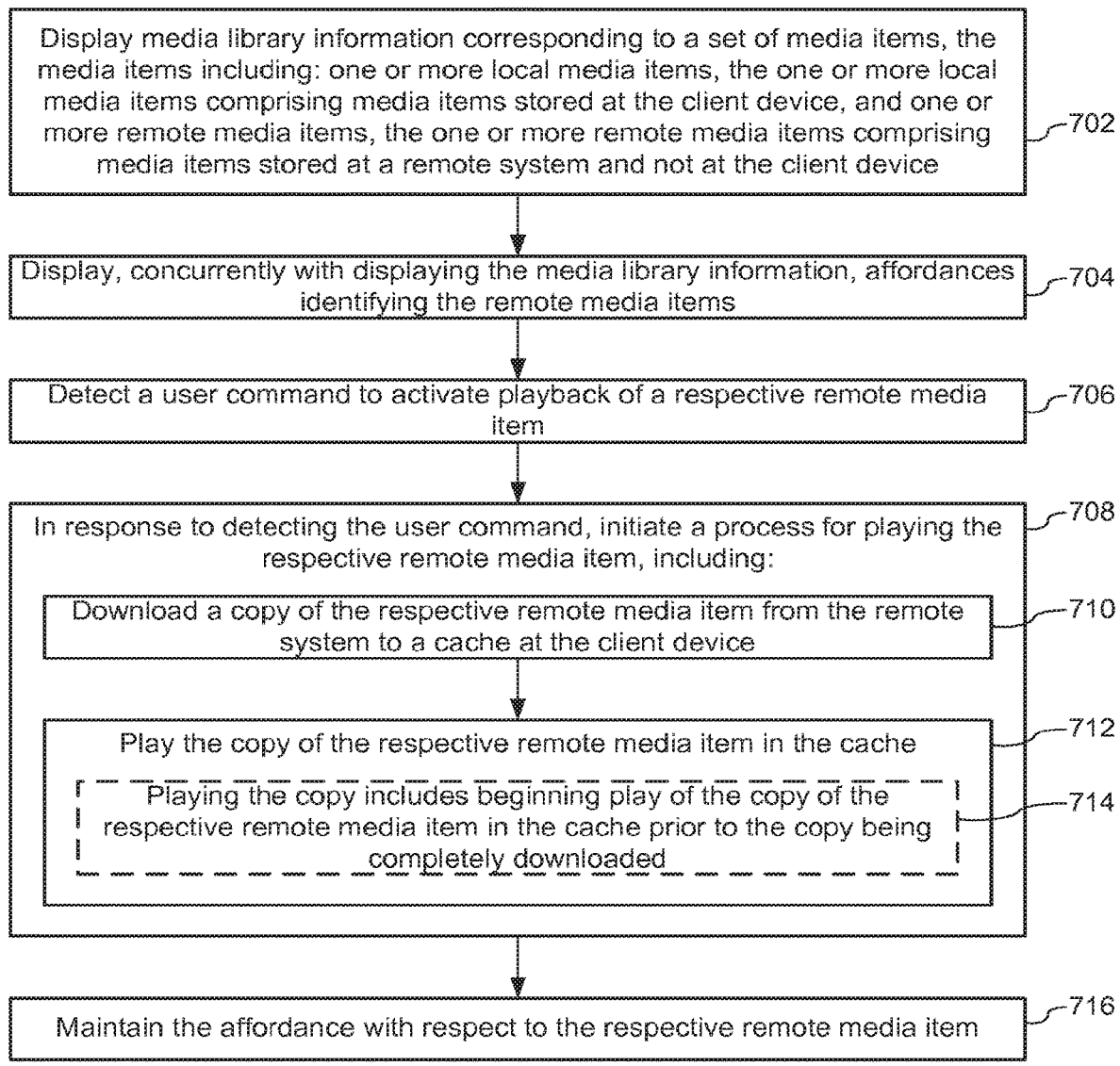
FIG. 7 is a flow diagram illustrating a method of playing a media item in accordance with some embodiments.

FIG. 7 is a flow diagram illustrating a method 700 of playing a media item in accordance with some embodiments. The method 700 is performed at a client device (e.g., device 102, FIG. 2; or device 106, FIG. 3). Some operations in method 700 may be combined and/or the order of some operations may be changed.

The device displays (702) media library information corresponding to a set of media items, the media items including: one or more local media items, the one or more local media items comprising media items stored at the client device, and one or more remote media items, the one or more remote media items comprising media items stored at a remote system and not at the client device. For example, in FIG. 6A, media items list 620 is displayed. Media items list 620 include media items that are locally stored (e.g., items 622-1, 622-4) and items that are remotely stored and not locally stored (e.g., items 622-2, 622-3). As another example, in FIG. 6F, playlist items list 651 is displayed in user interface 650. Playlist items list 651 includes items that are locally stored (e.g., item 652-2) and items that are remotely stored and not locally stored (e.g., items 652-1, 652-4). It is noted that, in some circumstances, there are zero local media items that are stored at the client device. Furthermore, in some circumstances, there are zero remote media items that are stored at the remote system but not at the client device (i.e., all media items stored at the remote system are also stored at the client device). The functions described herein with respect to playing, manipulating or displaying information about non-local content are applicable regardless of whether the client device currently stores any local items. Similarly, the functions described with respect to playing, manipulating or displaying information about locally stored content are applicable regardless of whether the user account currently includes any items that are remotely stored but not locally stored.

The device displays (704), concurrently with displaying the media library information, affordances identifying the remote media items. For example, in FIG. 6A, icon 623 is displayed for items 622-2 and 622-3. As another example, in FIG. 6E, icon 636 is displayed for items 652-1 and 652-4.

The device detects (706) a user command to activate playback of a respective remote media item. For example, in FIG. 6A, a user may select item 622-1 and click on play button 624 or double-click on item 622-1. As another example, in FIG. 6E, the user may select as media item 652 (e.g., by tapping on the item on touch screen 212) to play it.

In response to detecting the user command, the device initiates (708) a process for playing the respective remote media item, including: downloading (710) a copy of the respective remote media item from the remote system to a cache at the client device, and playing (712) the copy of the respective remote media item in the cache. For example, in response to the user command (e.g., clicking on play button 624) to play item 622-1, item 622-1 is downloaded into media cache 356 and the cached item is played. As another example, in response to a user command to play item 652-4, item 652-4 is downloaded into media cache 245 and the cached item is played.

In some embodiments, playing the copy includes beginning play of the copy of the respective remote, media item in the cache prior to the copy being completely downloaded (714). The cached item may be played prior to completion of the download into the cache. This shortens the delay, if any, between the user command to play the item and start of playback.

The device maintains (716) the affordance with respect to the respective remote media item. The affordance continues to be displayed for the remote media item that was played. For example, in FIG. 6E, icon 636 continues to be displayed for item 652-4.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 800 (e.g., FIGS. 8A-8E) are also applicable in an analogous manner to method 700 described above with respect to FIG. 7. For example, the local media items and remote media items described above with reference to method 700 may have one or more of the characteristics of the local media items and remote media items described herein with reference to method 800. For brevity, these details are not repeated here.

FIGS. 8A-8E are flow diagrams illustrating a method 800 of downloading a media item in accordance with some embodiments. The method 800 is performed at an electronic device (e.g., device 102, FIG. 2; or device 106, FIG. 3). Some operations in method 800 may be combined and/or the order of some operations may be changed.

The device displays (802) media library information corresponding to a set of media items, the media items including: one or more local media items, the one or more local media items comprising media items stored at the client device, and one or more remote media items, the one or more remote media items comprising media items stored at remote system and not at the client device. For example, in FIG. 6A, media items list 620 is displayed. Media items list 620 include media items that are locally stored (e.g., items 622-1, 622-4) and items that are remotely stored and not locally stored (e.g., items 6222, 622-3). As another example, in FIG. 6E, playlist items list 651 is displayed in user interface 650. Playlist items list 651 includes items that are locally stored (e.g., item 652-2) and items that are remotely stored and not locally stored (e.g., items 652-1, 652-4). As noted above, in some circumstances, there are zero local media items that are stored at the client device. Furthermore, in some circumstances, there are zero remote media items that are stored at the remote system hut not at the client device (i.e., all media items stored at the remote system are also stored at the client device). The functions described herein with respect to playing, manipulating or displaying information about non-local content are applicable regardless of whether the client device currently stores any local items. Similarly, the functions described with respect to playing, manipulating or displaying information about locally stored content are applicable regardless of whether the user account currently, includes any items that are remotely stored but not locally stored.

In some embodiments, displaying media library information further includes suppressing display of respective media items in the set of media items that match predefined filter criteria (804). When the media library information is displayed, some media items may be hidden from display in accordance with filtering criteria (e.g., parental filter based on content raring, or other user specified or user defied filter).

The device displays (806), concurrently with displaying the media library information, affordances identifying the remote media items. For example, in FIG. 6A, icon 623 is displayed for items 622-2 and 622-3. As another example, in FIG. 6E, icon 636 is displayed for items 652-1 and 652-4.

The device detects (808) user interaction with an affordance identifying a respective remote media item. For example, in FIG. 6A, the user clicks on icon 623 for media item 622-2 or 622-3. As another example, in FIG. 6C, the user performs a gesture (e.g., a tap) on icon 636 for either item 634-1 or 634-2.

In response to detecting the user interaction, the device initiates (810) a process for downloading a copy of the respective remote media item to the client device for storage at the client device. For example, in response to the user clicking on icon 623 for media item 622-2, client device 106 initiates a download of item 622-2 to client device 106. As another example, in response to the user performing a gesture on icon 636 for media item 634-2, client device 102 initiates a download of media item 634-2 to client device 102.

In some embodiments, downloading a copy of the respective remote media item includes downloading the copy for storage at the client device (812). The download of the media item may be for permanent storage at the client device.

In some embodiments, downloading a copy of the respective remote media item includes downloading the copy into a cache (814). The download of the media item may be for storage in a cache, where the media item copy is subject to automatic eviction.

In some embodiments, the device responds (816) to a predefined user command with respect to a playlist that includes one or more local media items and one or more remote media items, by playing the media items in the playlist in a sequence determined by the playlist. When the user issues a command to play a playlist of media items, and the playlist includes local media items and remote media items, the client device attempts to play them in the playlist order.

In some embodiments, the device determines (818) whether the client device has a connection to the remote system. The device responds (820) to a predefined user command with respect to a user-defined playlist that includes one or more local media items and one or more remote media items, when a connection to the remote system is present, by playing the media items in the user-defined playlist in a sequence determined by the user-defined playlist. The device responds (822) to the predefined user command with respect to the user-defined playlist, when a connection to the remote system is absent, by playing only the local media items in the user-defined playlist in the sequence determined by the user-defined playlist. For example, the client device determines whether it has a connection to remote server 112 through network(s) 110. When the user issues a command to play a playlist of media items, and the playlist includes local media items and remote media items, the client device attempts to play them in the playlist order. If the client device has a connection to remote server 112 the client device plays both the local and remote media items in the playlist. If the client device does not have a connection to remote server 112 (e.g., because either is offline), the client device plays just the local media items in the playlist and skips the remote media items.

In some embodiments, a playlist is a user-defined playlist, or computer generated playlist (e.g., generated in accordance with user-defined rules, generated based on analysis of the media items, or randomly generated).

In some embodiments, displaying the media library information includes displaying a list identifying the local media items and the remote media items, and displaying the affordances includes displaying respective icons identifying the remote media items in the list. For example, in FIG. 6A, the media library information is displayed in the form of a list of songs by album by artist, and icon 623 is displayed for remote media items in the list such as items 622-2 and 622-3. As another example, in FIG. 6C, a songs list is displayed, and icon 636 is displayed for remote media items 634-1 and 634-2.

In some embodiments, the respective icons identifying the remote media items are interactive affordances. Detecting interaction with the affordance corresponding to a respective remote media item includes detecting interaction with the respective icon corresponding to the respective remote media item. In some implementations, icon 623 is interactive and is configured to activate or initiate a process when clicked on by the user. Similarly, in some implementations icon 636 is to and is configured to activate or initiate a process when the user performs a predefined gesture (e.g., a tap gesture) on it.

In some embodiments, an order of the media items in the list is irrespective of whether a respective media item is a local media item or a remote media item (828). The media items in the list are listed in an order that is not affected by whether a media item is a local media item or a remote media item.

In some embodiments, the list identifying the media items is ordered by one or more characteristics selected from the set consisting of title, artist or author, album or collection, publisher, issue, rating, time, and genre, and wherein the order of the media items in the list is irrespective of which listed media items are local media items and which listed media items are remote media items (830). For example, the media items list in FIG. 6A is ordered lie album by artist, without regard to whether a media item is a local media item or a remote media item. Similarly, in FIG. 6C, the Media its are listed by alphabetical and numeric order with regard to whether a media item is a local media item or a remote media item.

In some embodiments, displaying the media library information includes displaying a collections gallery comprising one or more collections, wherein each of a plurality of the media items is associated with a respective collection; and displaying the affordances includes displaying respective icons to identify respective collections that are respectively associated with one or more remote media items (832). Collections may be collections of music media items, video media items, magazine media items, etc. Examples of a collection include an album, music media items by a particular artist, music media items in a particular genre, episodes of as podcast, episodes in a television series, etc. In some embodiments, collections also include playlists. In some implementations, collections include collections that include media items of two or more distinct media types (e.g., music media hems and video media items).

For example, in FIG. 6B, album gallery 626 is displayed. Albums 628 in album gallery 626 include media items in the media library. Icon 630 is displayed for albums that Include one or more remote media items, such as album 628-1. As another example, in FIG. 6D icon 646 is displayed for playlist 642-6.

In some embodiments, the device detects (834) interaction with an affordance corresponding to a collection having an icon identifying the collection as associated with one or more remote media items; and in response to detecting the interaction, initiates (836) a process for downloading respective copies of at least one of the remote media items associated with the collection to the client device for storage at the client device. For example, in FIG. 6B, the user may click on icon 630 displayed for a album 628-1 to initiate download of one or more of the remote media items in album 628-1.

In some embodiments, displaying the affordances includes, for a respective collection having one or more remote media items, displaying a number indicating a count of remote media, items in the respective collection (838). For example, in FIG. 6D, icon 646 for playlist 642-6 includes a number indicating a count of media items in playlist 642-6 that are not locally stored at the client device.

In some embodiments, one or more of the remote media items are copies of corresponding local media items that have been removed from the client device (840). A remote media item may formerly have been a locally stored media item that has since been deleted, leaving the remote media item. As discussed elsewhere in this document, in some implementations, the content of the deleted locally stored media item that corresponds to the remaining remote media item need not be identical to the content of the remote media item.

In some embodiments, one or more of the remote media items correspond to digital media purchases at, a digital media store and have no corresponding local media item (842). In one example, a remote media item is a media item purchased from the digital media store, and thus part of the user's media library, but has yet to be downloaded to the client device.

In some embodiments, the device locally stores (844) at the client device metadata for each media item in the set of media items, the locally stored metadata for a respective media item including storage location information indicating whether the respective media item is locally stored at the client device, and whether the respective media item is remotely stored at the remote system. For example, at client device 102, media metadata 244 (or media metadata 344 at client device 106) includes metadata for each of the media items in the media library. The media metadata for a media item includes information on where the media item is stored, such as locally (the media metadata includes a path to the local file) and/or remotely (the media metadata includes a reference to the remote item).

In some embodiments, the locally stored metadata for the respective media item includes a source indicia indicating whether the respective media item was purchased at a predefined digital media store (846). For example, if a media item was purchased from the digital media store, the media metadata for the media item may include an identifier of the media item that is used the digital media store.

In some embodiments, when the storage location information indicates that a respective media item is locally stored at the client device, the storage location information further indicates whether the respective media item is durably stored at the client device or is cached at the client device (848). As described above, a media item that is stored at the client device may be durably stored at the client device or cached at the client device. The media metadata for that item may include data that indicates whether the media item is durably stored or cached at the client device.

In some embodiments, the storage location information for a respective media item includes state information selected from the set consisting of locally stored, locally cached, remotely stored, and a plurality of transitional states (850). A media item in the media library may have one of multiple storage states, including locally stored at the client device (with or without a corresponding remotely stored media item), locally cached (i.e., remotely stored but cached locally for playback), remotely stored, and any of a number of transitional states.

In some embodiments, the plurality of transitional states comprises: transitioning to local storage, transitioning to cache, purchase transaction in process, and being deleted from local storage (852). The transitional states may include download to client device for permanent storage in progress (i.e., transitioning local storage), download to client device for caching in progress (i.e., transitioning to cache), purchase transaction in progress (e.g., where user has made a purchase from the digital media store, and the store is processing the purchase), and being deleted from local storage when the user has instructed, from another device, deletion of the locally stored item and the corresponding remotely stored item, and the deletion has yet to be carried out at the client device).

In some embodiments, in response to a predefined trigger condition, the device initiates (854) synchronization of the locally stored metadata with corresponding metadata stored at the remote system. In response to a trigger condition, the client device synchronizes media metadata with remote server 112/remote storage 114. Examples of trigger conditions include arrival of a scheduled synchronization time or a user action that causes a significant change to the media library (e.g. deletion of a locally stored media item).

In some embodiments, the device updates a file path in the metadata for a respective media item when the respective media item is downloaded to the client device (855). When a remotely stored media item is downloaded to the client device, the metadata is updated to include the file path to the downloaded copy.

In some embodiments, one or more of the remote media items include corresponding copies cached at the client device, wherein the cached copies are subject to eviction from a cache at the client device in accordance with a cache management policy (856). As described above, a remotely stored media item may be played at the client device. To play the remotely stored media item, the client device downloads a copy of the remotely stored media item into the cache (e.g., cache 245 or 345) and the cached copy is played. The cached copy may be deleted (e.g., automatically deleted, without user action) from the client device in accordance with a cache management policy (e.g., least recently used file is deleted first).

In some embodiments, while displaying the media library information corresponding to the set of media items, the device suppresses (858) display of remote media items that have been marked as hidden. One or more media items in the media library may be marked as hidden in accordance with user command. When the media library information is displayed to the user at the client device (e.g., in user interface 600 or 631 or 640 or 650), those items marked as hidden are not displayed. In some embodiments, there is a user interface that the user may navigate to from media management application 104/108 that displays the hidden media items, and from that user interface the user may unhide any of the hidden items or take other action (e.g., delete an item completely from the user's media library).

In some embodiments, the device receives (860) a user command to delete a respective local media item from the client device and to mark the respective local media item as hidden. When the user issues a command to delete a locally stored media item from the client device, the file of the media item to be deleted may be retained instead of actually deleted, but marked as hidden instead. The media item is thus retained in the media library but hidden from the user (i.e., not displayed to the user in typical use).

In some embodiments, displaying the media library information corresponding to the set of media items is performed while the client device has an online connection to the remote system (862). When the client device is offline, the device displays (863) the media library information corresponding to the local media items and suppressing display of media library information corresponding to the remote media items stored at the remote system and not at the client device. When the client device is offline, and thus remote server 112 is unavailable, or remote server 112 is otherwise unavailable, remotely stored media items are not accessible at the client device. When information for the media library is displayed at the client device while the client device is offline, information corresponding to the remotely stored media items may thus be not displayed to the user. Alternatively, information corresponding to the remotely stored media items is displayed in a manner that visually distinguish the remotely stored media items from locally stored media items in the set of media items. In some implementations, the visually distinguishing indicia include graying out or another distinctive color or shade.

In some embodiments, displaying the media library information corresponding to the set of media items is performed while the client device has an online connection to the remote system, and one or more of the remote media items stored at the remote system and not at the client device are members of a playlist of one or more media items (864). When the client device is offline, the device displays (865) the media library information corresponding to the playlist, including displaying the media library information corresponding to the remote media items stored at the remote system and not at the client device with visual indicia identifying the remote media items in the playlist. When the client device is offline, and thus remote server 112 is unavailable, or remote server 112 is otherwise unavailable, remotely stored media items are not accessible at the client device. When a remotely stored item is a member of a playlist, and information for the playlist is displayed, information corresponding to the remotely stored item is displayed. In some implementations, information corresponding to the remotely stored item is displayed in a manner that distinguishes it from locally stored media items in the playlist. For example, the visually distinguishing indicia include graying out or another distinctive color or shade.

In some embodiments, displaying the media library information corresponding to the set of media items is performed while the client device has an online connection to the remote system (866). When the client device is offline, the device displays (868) the media library information corresponding to the set of media items, including: displaying, in accordance with a first predefined formatting, media library information for the one or more local media items stored at tire client device (870); and displaying, in accordance with a second predefined formatting that is visually distinct from the first predefined formatting, media library information for the one or more remote media items stored at the remote system and not at the client device (872). Displaying of the media library information at the client device is performed while the client device is online and has a connection to remote server 112, but can also be performed while the cheat is offline. When the client device is offline, and thus remote server 112 is unavailable, or remote server 112 is otherwise unavailable, remotely stored media items are not accessible at the client device. When information for the media library is displayed at the client device, information corresponding to the locally stored media items is displayed with one form of formatting (e.g., normal colored font) and information corresponding to the remotely stored media items is displayed with a different form of formatting (e.g., grayed-out font). The inaccessible remotely stored media items are thus distinguished from the locally stored media items that are accessible even when remote server 112 is unavailable.

In some embodiments, one or more of the local media items has a respective corresponding copy stored at the remote system (874). A local media item may have a corresponding copy or version that is stored at remote storage 114 or digital media store storage 118. The corresponding copy or version may come about in various ways.

For example, the corresponding copy or version may be an upload of the local media item to remote storage 114. In another example, the corresponding copy or version may be an item from the digital media store that is matched to the local media item. In a further example, the local media item may be a download of the corresponding copy or version to the client device.

In some embodiments, the device determines (876) whether a respective media item is stored at both the client device and the remote system, and displays an affordance identifying the respective media item as a remote media item if the respective media item is stored at the remote system and no corresponding copy is stored at the client device. Optionally, the client device periodically verifies that a locally stored item in the media library still exists at the client device. If the locally stored item is determined to no longer exist at the client device, the item is identified as a remotely stored item (assuming the corresponding remotely stored item is still remotely stored) and an affordance (e.g., icon 623 or 636) is displayed for the item.

In some embodiments, the copy of the respective remote media item downloaded to the client device for storage at the client device has One or more predefined quality metrics that are different from the predefined quality metrics of a corresponding previously deleted local media item (878). In some embodiments, part of the process of matching media items to lions at the digital media store include allowing the user to download the matching item from digital media store storage 118, which may have as different quality level (e.g., different bit rate, less lossy encoding) than the original locally stored item. Further, when, the original locally stored item is deleted, and the user wants to have the same item locally stored again, the user may have the matching remote media item, which may have a different quality level than the original locally stored item, downloaded for storage at the client device.

In some embodiments, in response to a predefined user command, the device replaces (880) a respective local media with a higher quality media item downloaded from the remote system, the higher quality media item having content corresponding to content of the is respective local media item. In some embodiments, part of the process of matching media items to items at the digital media store includes allowing the user to download the matching item from digital media store storage 118 to replace the original locally stored item, even if the matching item front digital media store storage 118 is of a higher quality (e.g., higher bit rate, less loss encoding). The replacement may be performed in accordance with a user command.

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 700 (e.g., FIG. 7) are also applicable in an analogous manner to method 400 described above with respect to FIGS. 8A-8E. For brevity, these details are not repeated here.

Figure 9A:
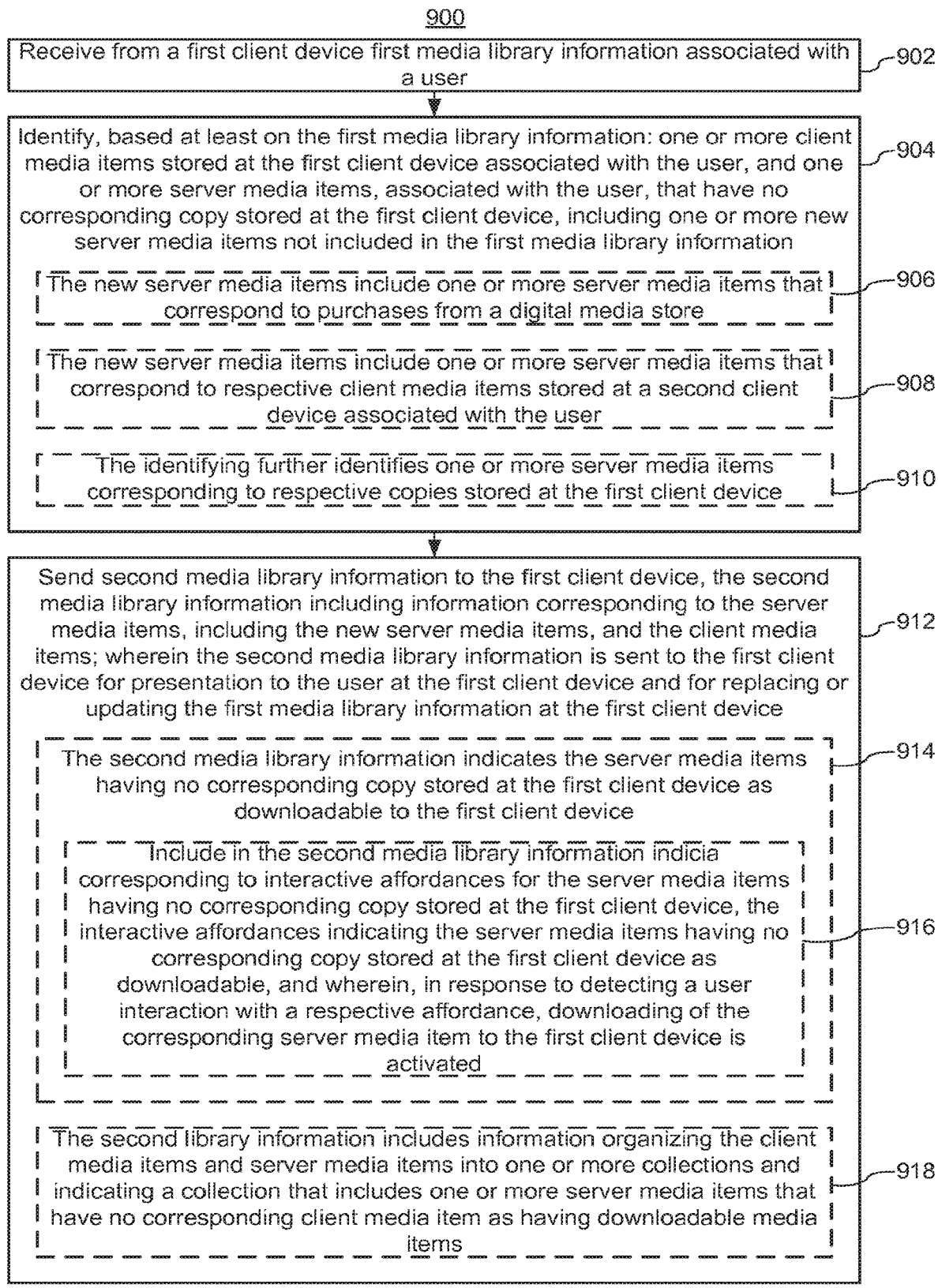
FIGS. 9A-9B are flow diagrams illustrating a method of updating media library information in accordance with some embodiments.
Figure 9B:
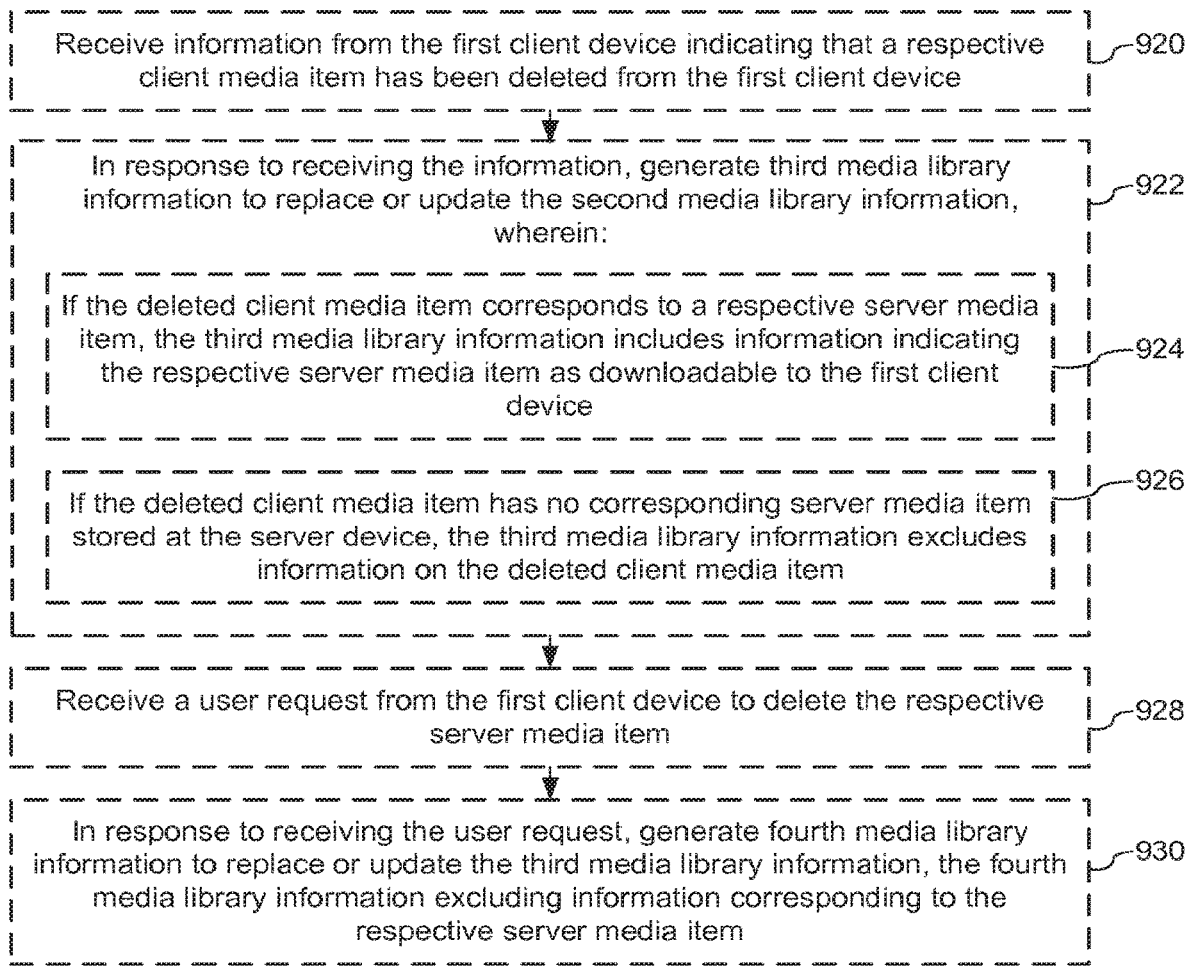

FIGS. 9A-9B are flow diagrams illustrating a method 900 of updating media library information in accordance with some embodiments. The method 900 is performed at a server or server system (e.g., remote server 112). Some operations in method 900 may be combined and/or the order of some operations may be changed.

The server receives (902) from a first client device first media library information associate with a user. When a client device (e.g., client device 102 or 106) communicates with remote server 112 to synchronize media libraries, remote server 112 receives data or information for media library 240 or 340 (e.g., media metadata 244 or 344) for a user.

The server identifies (904), based at least on the first media library information: one or more client media items stored at the first client device associated with the user, and one or more server media items, associated with the user, that have no corresponding copy stored at the first client device, including one or more new server media items not included in the first media library information. Remote server 112 compares the received media library information to the data or information for the corresponding user media library 441 to identify the media items in the media libraries that are stored at the first client device (the client media items) and the media items that are remotely stored and not stored at the first client device (the server media items). The media items that are identified as remotely stored and not locally stored may include one or more "new" media items that are not in the media library at the first client device (e.g., because the item(s) were synchronized from a second client device associated with the user to the server); these items are new from the perspective of the first client device.

In some embodiments, the new server media items include one or more server media items that correspond to purchases from a digital media store (906). For example, the media items that are new from the perspective of the first client device may be media items that were purchased from the digital media store using a second client device to access digital media store server 116. The purchased items were synchronized to remote server 112 and remote storage 114 but have yet to be synchronized to the first client device.

In some embodiments, the new server media items include one or more server media items that correspond to respective client media items stored at a second client device associated with the user (908). For example, the media items that are new from the perspective of the first client device may be media items that were added to the second client device (e.g., music media items generated from ripping compact disks) and synchronized to remote server 112 and remote storage 114, but have yet to be synchronized to the first client device.

In some embodiments, the identifying further identifies one or more server media items corresponding to respective copies stored at the first client device (910). The identification of the media items may include identifying remotely stored media items that correspond to media items stored at the first client device. For example, the identifying may include matching the media items stored at the first client device to media items in digital media store storage 118. The identifying may also include verifying that server media items that correspond to respective client media items at the first client device are still stored at remote storage 114 or digital media store storage 118 and not deleted (e.g., in accordance with a user command issued from a second client device).

The server sends (912) second media library information to the first client device, the second media library information including information corresponding to the server media items, including the new server media items, and the client media items; wherein the second media library information is sent to the first client device for presentation to the user at the first client device and for replacing or updating the first media library information at the first client device.

Remote server 112 generates update media library information and sends the updated media library information to the first client device to update or replace the media library information at the first client device. The updated media library information includes information on the new server media items as well as the other media items that are in the media library at the first client device. The updated media Library information may be displayed to the user of the first client device.

In some embodiments, the second media library information indicates the server media items having no corresponding copy stored at the first client device as downloadable to the first client device (914). The updated media library information indicates which of the media items in the media library is not stored at the first client device.

In some embodiments, the server includes (916) in the second media library information indicia corresponding to interactive affordances for the server media items having no corresponding copy stored at the first client device, the interactive affordances indicating the server media items having no corresponding copy stored at the first client device as downloadable, and wherein, in response to detecting a user interaction with a respective affordance, downloading of the corresponding server media item to the first client device is activated. The updated media library information identifies which media items are not locally stored at the first client device. At the first client device, interactive affordances (e.g., icon 623, FIG. 6A, or icon 636, FIG. 6C or 6E) are displayed for these identified items. Optionally, a user interacts with one or more of the interactive affordances to activate a download of the corresponding media items to the first client device.

In some embodiments, the second library information includes information organizing the client media items and server media items into one or more collections and indicating a collection that includes one or more server media items that have no corresponding client media item as having downloadable media items (918). For example, the media items may be organized into collections based on album, artist, playlist membership, publisher, studio, genre, etc., and the media library information includes album information, artist information, etc. for the media items. Optionally, collections that have one or more remote media items (media that are stored remotely and not stored at the first client device, excluding cached items) are identified by indicia in the second library information.

In some embodiments, when the server receives (920) information from the first client device indicating that a respective client media item has been deleted from the first client device, the server responds by generating (922) third media library information to replace or update the second media library information. If the deleted client media item corresponds to a respective server media item, the third media library information includes information indicating the respective server media item as downloadable to the first client device (924). If the deleted client media item has no corresponding server media item stored at the server device, the third media library information excludes information on the deleted client media item (926). A media item that is stored locally at the first client device is typically deleted from the first client dev ice in accordance with a user command. Remote server 112 receives information regarding the deletion (e.g., during a synchronization operation) and generates updated media library information to account for the deletion. If the deleted media item corresponds to a remotely stored media item, the item is indicated as an item that is remotely stored and not locally stored, and thus downloadable. If the deleted media item has no corresponding remotely stored media item, information regarding the deleted item is excluded from the updated media library information. As a result, the deleted item is no longer in the media library.

In some embodiments, when the server receives (928) a user request from the first client device to delete a respective server media item, the server responds by generating (930) fourth media library information to replace or update the third media library information, the fourth media library information excluding information corresponding to the respective server media item. For example, remote sever 112 may receive a user request or command to delete the remotely stored media item corresponding to the deleted locally stored media item. In response to the request or command, new media library information that excludes information regarding the deleted remotely stored media item is generated; the remotely stored media item is hidden from the library. In some circumstances (e.g., when the deleted media item was not purchased or otherwise obtained by the user from the digital media store), the remotely stored media item is deleted from remote storage 114.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein.

In many of the embodiment described above, the functions described with respect to playing or manipulating non-local content are applicable regardless of whether the client device currently stores any local items. Similarly, in many of the embodiments described above, the functions described with respect to playing or manipulating locally stored content are applicable regardless of whether the user account currently includes any items that are remotely stored but not locally stored.

The foregoing description, for purpose of explanation, has been described with reference to specific embodiments. However, the illustrative discussions above are not intended to be exhaustive or to limit the invention to the precise fours disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A client device, comprising:
one or more processors;
memory; and
one or more programs, wherein the one or more programs are stored in the memory and configured to be executed by the one or more processors, the one or more programs including instructions for:
displaying a user interface for managing a set of media items, wherein the set of media items includes one or more remote media items and one or more local media items;
wherein the one or more remote media items are media items stored at a remote system and not in a media library at the client device; and
wherein the one or more local media items are media items stored in a media library at the client device;

wherein displaying the user interface for managing the set of media items comprises:
when the client device has an online connection to the remote system, displaying local media items, and displaying remote media items and their respective affordances; and
when the client device is offline, displaying the local media items and suppressing display of the remote media items stored at the remote system and not in a media library at the client device.

2. The client device of claim 1, the one or more programs further including instructions for: responding to a predefined user command with respect to a playlist that includes one or more local media items and one or more remote media items, by playing the media items in the playlist in a sequence determined by the playlist.

3. The client device of claim 1, the one or more programs further including instructions for:
determining whether the client device has a connection to the remote system;
responding to a predefined user command with respect to a playlist that includes one or more local media items and one or more remote media items, when a connection to the remote system is present, by playing the media items in the playlist in a sequence determined by the playlist; and
responding to a predefined user command with respect to the playlist, when a connection to the remote system is absent, by playing only the local media items in the playlist in the sequence determined by the playlist.

4. The client device of claim 1,
wherein displaying the user interface includes displaying a collections gallery comprising one or more collections, wherein each of a plurality of the media items is associated with a respective collection.

5. The client device of claim 4, the one or more programs further including instructions for:
detecting interaction with an affordance corresponding to a collection having an icon identifying the collection as associated with one or more remote media items; and
in response to detecting the interaction, initiating a process for downloading respective copies of at least one of the remote media items associated with the collection to the client device for storage in a media library at the client device.

6. The client device of claim 1, wherein one or more of the remote media items are copies of corresponding local media items that have been removed from the client device.

7. The client device of claim 1, wherein one or more of the remote media items correspond to digital media purchases at a digital media store and have no corresponding local media item.

8. The client device of claim 1, wherein one or more of the remote media items include corresponding copies cached at the client device, wherein the cached copies at the client device are subject to eviction from a cache at the client device in accordance with a cache management policy.

9. The client device of claim 1, the one or more programs further including instructions for:
in response to receiving a user command to delete a respective local media item from the client device, marking the respective local media item as hidden.

10. The client device of claim 1, wherein displaying the user interface for managing the set of media items is performed while the client device has an online connection to the remote system, and one or more of the remote media items stored at the remote system and not in a media library at the client device are members of a playlist of one or more media items; the one or more programs further including instructions for:
when the client device is offline, displaying the playlist of one or more media items, including displaying the remote media items stored at the remote system and not in a media library at the client device with visual indicia identifying the remote media items in the playlist of one or more media items.

11. The client device of claim 1, wherein displaying the user interface for managing the set of media items is performed while the client device has an online connection to the remote system; the one or more programs further including instructions for:
when the client device is offline, displaying the user interface for managing the set of media items, including:
displaying, in accordance with a first predefined formatting, the one or more local media items stored in a media library at the client device; and
displaying, in accordance with a second predefined formatting that is visually distinct from the first predefined formatting, the one or more remote media items stored at the remote system and not in a media library at the client device.

12. The client device of claim 1, wherein one or more of the local media items has a respective corresponding copy stored at the remote system.

13. The client device of claim 1, the one or more programs further including instructions for: determining whether a respective media item is stored at both the client device and the remote system; and displaying an affordance identifying the respective media item if the respective media item is stored at the remote system and no corresponding copy is stored in a media library at the client device.

14. The client device of claim 1, wherein displaying the user interface further comprises suppressing display of respective media items in the set of media items that match predefined filter criteria.

15. The client device of claim 1, the one or more programs further including instructions for:
in response to a predefined user command, replacing a respective local media item with a higher quality media item downloaded from the remote system, the higher quality media item having content corresponding to content of the respective local media item.

16. A method comprising:
at a client device with a display:
displaying a user interface for managing a set of media items, wherein the set of media items includes one or more remote media items and one or more local media items;
wherein the one or more remote media items are media items stored at a remote system and not in a media library at the client device; and
wherein the one or more local media items are media items stored in a media library at the client device;
wherein displaying the user interface for managing the set of media items comprises:
when the client device has an online connection to the remote system, displaying local media items, and displaying remote media items and their respective affordances; and
when the client device is offline, displaying the local media items and suppressing display of the remote media items stored at the remote system and not in a media library at the client device.

17. The method of claim 16, further comprising:
responding to a predefined user command with respect to a playlist that includes one or more local media items and one or more remote media items, by playing the media items in the playlist in a sequence determined by the playlist.

18. The method of claim 16, further comprising:
determining whether the client device has a connection to the remote system;
responding to a predefined user command with respect to a playlist that includes one or more local media items and one or more remote media items, when a connection to the remote system is present, by playing the media items in the playlist in a sequence determined by the playlist; and
responding to a predefined user command with respect to the playlist, when a connection to the remote system is absent, by playing only the local media items in the playlist in the sequence determined by the playlist.

19. The method of claim 16, wherein displaying the user interface includes displaying a collections gallery comprising one or more collections, wherein each of a plurality of the media items is associated with a respective collection.

20. The method of claim 19, further comprising:
detecting interaction with an affordance corresponding to a collection having an icon identifying the collection as associated with one or more remote media items; and
in response to detecting the interaction, initiating a process for downloading respective copies of at least one of the remote media items associated with the collection to the client device for storage in a media library at the client device.

21. The method of claim 16, wherein one or more of the remote media items are copies of corresponding local media items that have been removed from the client device.

22. The method of claim 16, wherein one or more of the remote media items correspond to digital media purchases at a digital media store and have no corresponding local media item.

23. The method of claim 16, wherein one or more of the remote media items include corresponding copies cached at the client device, wherein the cached copies at the client device are subject to eviction from a cache at the client device in accordance with a cache management policy.

24. The method of claim 16, further comprising:
in response to receiving a user command to delete a respective local media item from the client device, marking the respective local media item as hidden.

25. The method of claim 16, wherein displaying the user interface for managing the set of media items is performed while the client device has an online connection to the remote system, and one or more of the remote media items stored at the remote system and not in a media library at the client device are members of a playlist of one or more media items; the one or more programs further including instructions for:
when the client device is offline, displaying the playlist of one or more media items, including displaying the remote media items stored at the remote system and not in a media library at the client device with visual indicia identifying the remote media items in the playlist of one or more media items.

26. The method of claim 16, wherein displaying the user interface for managing the set of media items is performed while the client device has an online connection to the remote system; the one or more programs further including instructions for:
when the client device is offline, displaying the user interface for managing the set of media items, including:
displaying, in accordance with a first predefined formatting, the one or more local media items stored in a media library at the client device; and
displaying, in accordance with a second predefined formatting that is visually distinct from the first predefined formatting, the one or more remote media items stored at the remote system and not in a media library at the client device.

27. The method of claim 16, wherein one or more of the local media items has a respective corresponding copy stored at the remote system.

28. The method of claim 16, further comprising:
determining whether a respective media item is stored at both the client device and the remote system; and
displaying an affordance identifying the respective media item if the respective media item is stored at the remote system and no corresponding copy is stored in a media library at the client device.

29. The method of claim 16, wherein displaying the user interface further comprises suppressing display of respective media items in the set of media items that match predefined filter criteria.

30. The method of claim 16, further comprising:
in response to a predefined user command, replacing a respective local media item with a higher quality media item downloaded from the remote system, the higher quality media item having content corresponding to content of the respective local media item.

31. A non-transitory computer readable storage medium storing one or more programs, the one or more programs comprising instructions, which when executed by a client device having one or more processors and memory, cause the client device to:
displaying a user interface for managing a set of media items, wherein the set of media items includes one or more remote media items and one or more local media items;
wherein the one or more remote media items are media items stored at a remote system and not in a media library at the client device; and
wherein the one or more local media items are media items stored in a media library at the client device;
wherein displaying the user interface for managing the set of media items comprises:
when the client device has an online connection to the remote system, displaying local media items, and displaying remote media items and their respective affordances; and
when the client device is offline, displaying the local media items and suppressing display of the remote media items stored at the remote system and not in a media library at the client device.

32. The non-transitory computer readable storage medium of claim 31, the one or more programs further including instructions for: responding to a predefined user command with respect to a playlist that includes one or more local media items and one or more remote media items, by playing the media items in the playlist in a sequence determined by the playlist.

33. The non-transitory computer readable storage medium of claim 31, the one or more programs further including instructions for:
determining whether the client device has a connection to the remote system;

responding to a predefined user command with respect to a playlist that includes one or more local media items and one or more remote media items, when a connection to the remote system is present, by playing the media items in the playlist in a sequence determined by the playlist; and responding to a predefined user command with respect to the playlist, when a connection to the remote system is absent, by playing only the local media items in the playlist in the sequence determined by the playlist.

34. The non-transitory computer readable storage medium of claim 31, wherein displaying the user interface includes displaying a collections gallery comprising one or more collections, wherein each of a plurality of the media items is associated with a respective collection.

35. The non-transitory computer readable storage medium of claim 34, the one or more programs further including instructions for:

detecting interaction with an affordance corresponding to a collection having an icon identifying the collection as associated with one or more remote media items; and in response to detecting the interaction, initiating a process for downloading respective copies of at least one of the remote media items associated with the collection to the client device for storage in a media library at the client device.

36. The non-transitory computer readable storage medium of claim 31, wherein one or more of the remote media items are copies of corresponding local media items that have been removed from the client device.

37. The non-transitory computer readable storage medium of claim 31, wherein one or more of the remote media items correspond to digital media purchases at a digital media store and have no corresponding local media item.

38. The non-transitory computer readable storage medium of claim 31, wherein one or more of the remote media items include corresponding copies cached at the client device, wherein the cached copies at the client device are subject to eviction from a cache at the client device in accordance with a cache management policy.

39. The non-transitory computer readable storage medium of claim 31, the one or more programs further including instructions for:

in response to receiving a user command to delete a respective local media item from the client device, marking the respective local media item as hidden.

40. The non-transitory computer readable storage medium of claim 31, wherein displaying the user interface for managing the set of media items is performed while the client device has an online connection to the remote system, and one or more of the remote media items stored at the remote system and not in a media library at the client device are members of a playlist of one or more media items; the one or more programs further including instructions for:

when the client device is offline, displaying the playlist of one or more media items, including displaying the remote media items stored at the remote system and not in a media library at the client device with visual indicia identifying the remote media items in the playlist of one or more media items.

41. The non-transitory computer readable storage medium of claim 31, wherein displaying the user interface for managing the set of media items is performed while the client device has an online connection to the remote system; the one or more programs further including instructions for:

when the client device is offline, displaying the user interface for managing the set of media items, including:

displaying, in accordance with a first predefined formatting, the one or more local media items stored in a media library at the client device; and displaying, in accordance with a second predefined formatting that is visually distinct from the first predefined formatting, the one or more remote media items stored at the remote system and not in a media library at the client device.

42. The non-transitory computer readable storage medium of claim 31, wherein one or more of the local media items has a respective corresponding copy stored at the remote system.

43. The non-transitory computer readable storage medium of claim 31, the one or more programs further including instructions for: determining whether a respective media item is stored at both the client device and the remote system; and displaying an affordance identifying the respective media item if the respective media item is stored at the remote system and no corresponding copy is stored in a media library at the client device.

44. The non-transitory computer readable storage medium of claim 31, wherein displaying the user interface further comprises suppressing display of respective media items in the set of media items that match predefined filter criteria.

45. The non-transitory computer readable storage medium of claim 31, the one or more programs further including instructions for:

in response to a predefined user command, replacing a respective local media item with a higher quality media item downloaded from the remote system, the higher quality media item having content corresponding to content of the respective local media item.

\* \* \* \* \*